United States Patent [19]

Machino

[11] Patent Number: 5,323,884

[45] Date of Patent: Jun. 28, 1994

[54] SHOCK ABSORBING APPARATUS AND DRIVE UNIT WHICH USES THE SAME

[75] Inventor: Masaki Machino, Ibaraki, Japan

[73] Assignee: Canon Kabushiki Kaisha, Tokyo, Japan

[21] Appl. No.: 857,636

[22] Filed: Mar. 25, 1992

[30] Foreign Application Priority Data

May 2, 1991 [JP] Japan .................................. 3-100649

[51] Int. Cl.⁵ .............................. F01B 9/00; F16F 5/00
[52] U.S. Cl. ................................... 188/312; 74/89.17; 92/136
[58] Field of Search ............... 188/312, 285, 302, 319, 188/284, 266; 74/89.17, 422; 92/85 R, 136; 267/75, 116, 119, 130

[56] References Cited

U.S. PATENT DOCUMENTS

| | | | |
|---|---|---|---|
| 1,273,059 | 7/1918 | Hild | 188/312 |
| 2,029,829 | 2/1936 | Messier | 188/98 |
| 3,156,160 | 11/1964 | Meyer | 92/136 X |
| 3,213,760 | 10/1965 | Carr | 92/136 X |
| 3,447,423 | 6/1969 | Henry | 92/136 X |
| 3,776,100 | 12/1973 | Yeh | 92/136 X |
| 4,591,031 | 5/1986 | Kirst | 188/312 X |
| 4,700,611 | 10/1987 | Kaneko | 188/284 X |

FOREIGN PATENT DOCUMENTS

| | | |
|---|---|---|
| 0178412 | 4/1986 | European Pat. Off. . |
| 1455859 | 11/1969 | Fed. Rep. of Germany . |
| 3306480 | 8/1984 | Fed. Rep. of Germany ........ 92/136 |
| 1152995 | 2/1958 | France . |
| 1170483 | 5/1961 | France ................. 92/136 |
| 2274853 | 1/1976 | France . |
| 2300940 | 9/1976 | France . |
| 53-3141 | 10/1972 | Japan . |
| 413583 | 1/1992 | Japan . |
| WO8403129 | 8/1984 | PCT Int'l Appl. . |
| 933424 | 8/1963 | United Kingdom ................. 92/136 |
| 1142381 | 2/1989 | United Kingdom ................. 92/136 |

Primary Examiner—Robert J. Oberleitner
Assistant Examiner—Alfred Muratori
Attorney, Agent, or Firm—Fitzpatrick, Cella, Harper & Scinto

[57] ABSTRACT

A shock absorbing apparatus comprises a cylinder body having a cylinder chamber formed therein, a piston body reciprocatively held in the cylinder chamber and having a pair of piston rods outwardly projecting through hole portions respectively formed at the two end portions of the cylinder chamber, and a shock absorber for absorbing motion when one of the piston rods projects over one of the hole portions and the leading portion of the other piston rod is stopped in the other hole portion, so that a shock generated at the time of collision with an object is absorbed. In addition, a drive unit for rotating a rotational member around a base comprises a shaft body secured to the base and having an engaging portion on the outer surface thereof, a rotational member journalled rotatively around the shaft body, an operation chamber provided for the rotational member, and a reciprocating member reciprocatively held in the lengthwise direction of the operation chamber and having a portion engaged to the engaging portion. A shock absorbing apparatus is adapted to the reciprocating member so as to absorb the shock generated at the portion at which the rotational member stops its rotational motion.

8 Claims, 17 Drawing Sheets

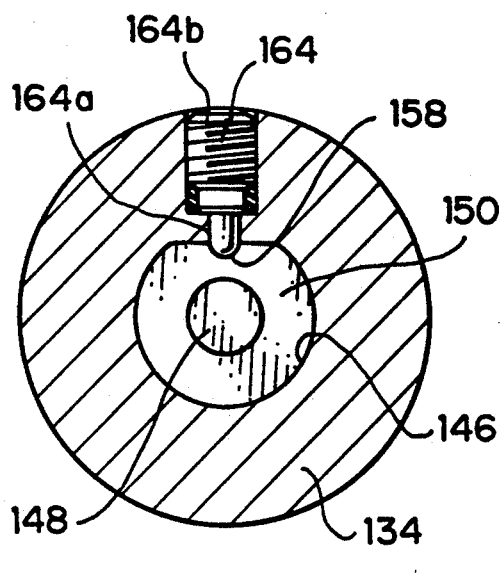
FIG. 15
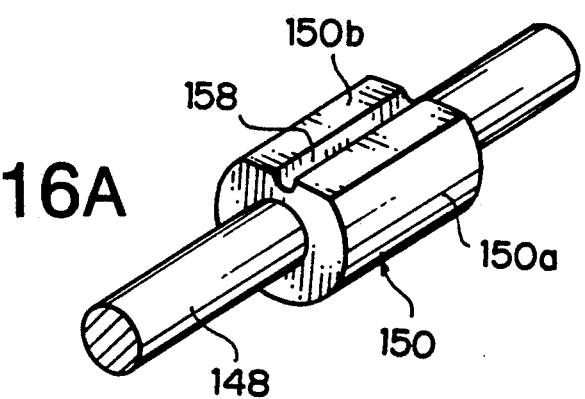
FIG. 16A
FIG. 16B
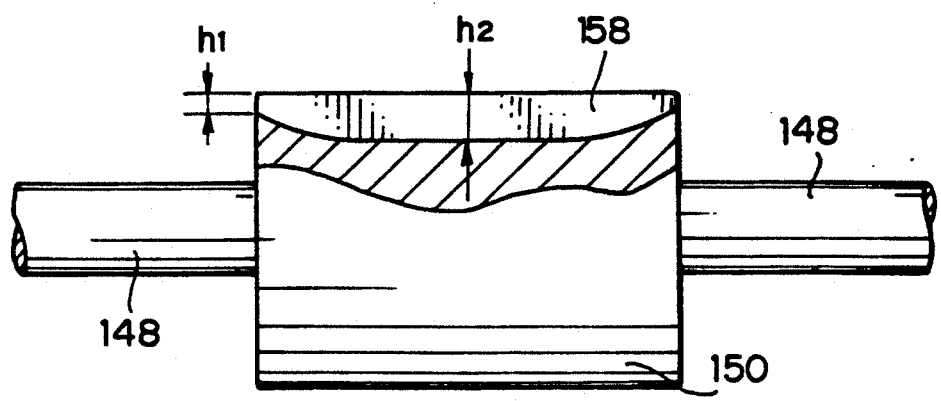

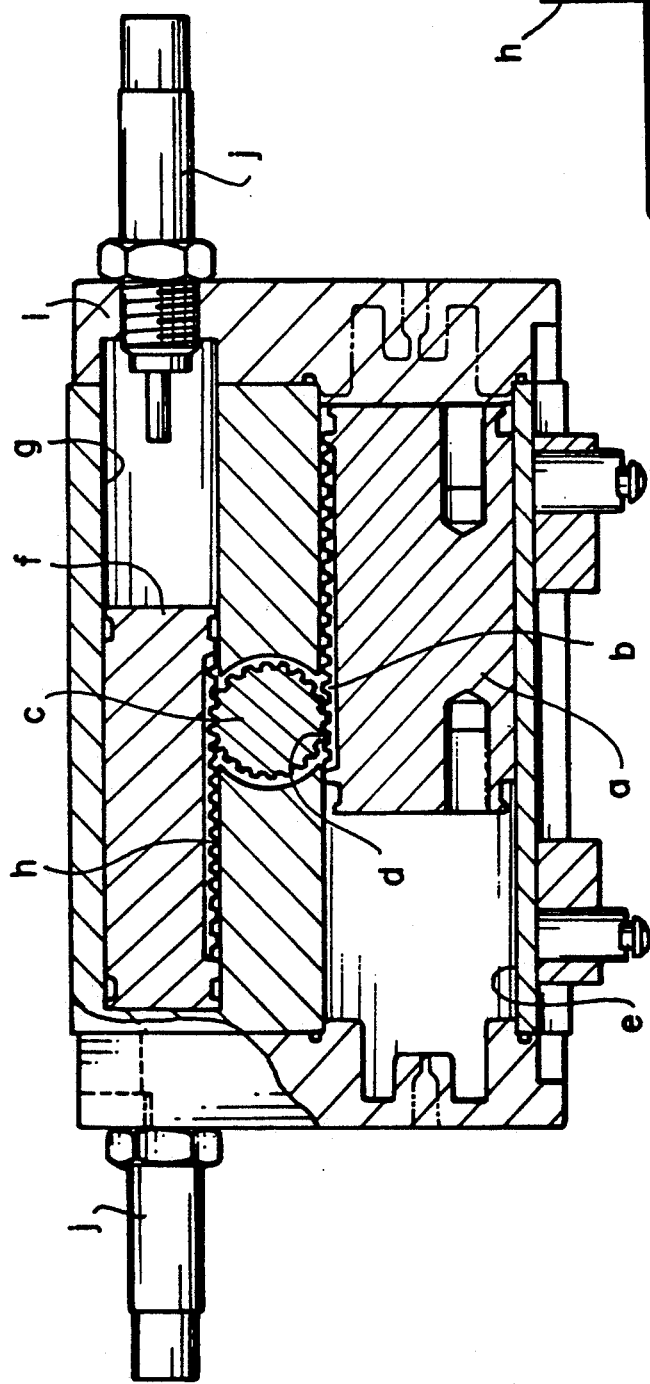
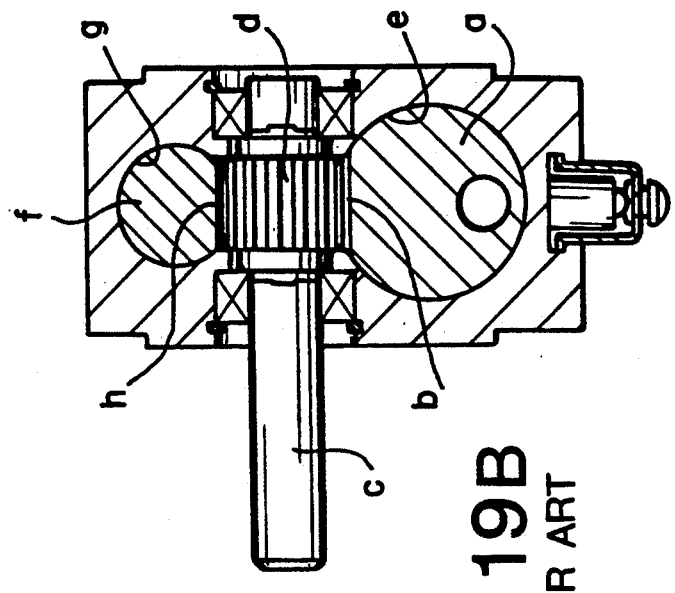
FIG. 19A PRIOR ART
FIG. 19B PRIOR ART

SHOCK ABSORBING APPARATUS AND DRIVE UNIT WHICH USES THE SAME

FIELD OF THE INVENTION

The present invention relates to a shock absorbing apparatus for absorbing shocks generated at two end positions of a drive unit which performs a reciprocating motion when the drive unit stops its operation, and a drive unit which uses the same.

BACKGROUND OF THE INVENTION

A conventional shock absorbing apparatus will now be described with reference to the drawings. FIG. 18 is a central cross sectional view which illustrates a conventional single-type shock absorbing apparatus which has a body including a cylindrical portion formed therein, the cylindrical portion including a piston 202 integrally formed with a rod 201 and arranged slidably in a direction designated by arrows. On the other hand, the piston 202 has an orifice hole 203 bored therein so as to cause an enclosed operating fluid 204 to pass through the orifice hole 203. As a result, shocks can be absorbed.

As shown in FIGS. 19A and 19B, a structure for use in, for example, rotation drive unit has been known. The rotation drive unit has a rack b formed on one side surface of a drive piston a which gives rotational force to a rotational member (omitted from illustration). On the other hand, a drive shaft c, which is connected to the rotational member, has a pinion gear d engaged to the rack b. In a state where the aforesaid two elements are engaged to each other, compressed air serving as drive fluid, is introduced into a drive cylinder chamber e which accommodates the drive piston a, causing the drive piston a to be moved in the drive cylinder chamber 4. The movement of the drive piston e is, as rotational force, transmitted to the drive shaft c via the engaged rack b and the pinion gear d. As a result, the rotational member can be rotated.

In the aforesaid conventional structure, the range in which the rotational member is rotated, that is the range in which the drive shaft c is rotated is defined by a structure arranged in such a way that a piston f individually formed from the drive piston a and moving in synchronization with the drive piston a is slidably provided in a cylinder chamber g, a rack h formed on the piston f and the pinion gear d of the drive shaft c are engaged to each other. As a result, the two end portions of the rotational range of the rotational member are respectively defined at the two end portions of the movement range of the piston f. Therefore, stopper members i must be used in order to accurately stop the piston f at the aforesaid two end portions of the movement range of the piston f. Furthermore, shock absorbing apparatuses j must be provided at the two end portions of the cylinder chamber g in order to absorb the shock generated at the time of stopping the piston f before the stopper member i comes in contact with the stopper member i and stops there.

However, since the aforesaid conventional shock absorbing apparatus is able to absorb only one directional shock, two shock absorbing apparatuses must be disposed at the two end portions of the reciprocating motion in order to absorb the shock of a reciprocating movable body. Therefore, a problem arises in that the size of the apparatus cannot be reduced. Furthermore, if a function of adjusting the quantity of the shock absorption is further provided, the size of the apparatus becomes too large and the weight increases excessively.

The rotation drive unit which uses, for example, an air cylinder, as its power source, must be quickly stopped after it has performed the rotational operation. In order to rotate it in the two directions around the shaft, two shock absorbing apparatuses must be used. Therefore, the size and the cost of the rotation drive unit cannot be reduced.

SUMMARY OF THE INVENTION

Accordingly, a shock absorbing apparatus according to the present invention is established while taking the aforesaid problems into consideration and an object of the invention is therefore to provide a shock absorbing apparatus the size and weight of which can be reduced.

Another object of the present invention is to provide a shock absorbing apparatus which further comprises a mechanism for adjusting the quantity of shock absorption and the size and weight of which can be reduced.

Another object of the present invention is to provide a drive unit which uses the shock absorbing apparatus as a movable body, the size and weight of which can thereby be reduced and from which another effect of cost reduction can be obtained.

In order to overcome the aforesaid problems and to achieve the object, a shock absorbing apparatus comprises: a cylinder body having a cylinder chamber formed therein; a piston body reciprocatively held in said cylinder chamber and having a pair of piston rods projecting outwardly through hole portions respectively formed at the two end portions of said cylinder chamber; and shock absorbing means for absorbing motion when one of said piston rods projects over one of said hole portions and the leading portion of the other piston rod is stopped in the other hole portion.

It is preferable to comprise a cylinder body having a pair of cylinder chambers formed substantially symmetrically; a pair of piston bodies disposed substantially symmetrically and each having a piston body reciprocatively held in said cylinder chamber and having a pair of piston rods projecting outwardly through hole portions respectively formed at the two end portions of said cylinder chamber; and shock absorbing means for absorbing motion when one of said piston rods projects over one of said hole portions and the leading portion of the other piston rod is stopped in the other hole portion.

It is preferable to comprise a cylinder body having a cylinder chamber formed therein; and a piston body reciprocatively held in said cylinder chamber and having a pair of piston rods projecting outwardly through hole portions respectively formed at the two end portions of said cylinder chamber; wherein shock absorbing means for absorbing motion when one of said piston rods projects over one of said hole portions and the leading portion of the other piston rod is stopped in the other hole portion is composed of a shock absorbing chamber filled with an operating fluid for absorbing a shock, a piston rod penetrating said shock absorbing chamber and capable of projecting over the two end portions of said piston body, a partition wall integrally formed at substantially the central portion of said piston rod and sectioning said shock absorbing chamber into two chambers and an orifice portion formed on the outer surface of said partition wall and communicating said sectioned shock absorbing chambers with each other.

It is preferable for a drive unit for rotating a rotational member around a base to comprise: a shaft body secured to said base and having an engaging portion on the outer surface thereof; a rotational member journalled rotatively around said shaft body; an operation chamber provided for said rotational member; and reciprocating means reciprocatively held in the lengthwise direction of said operation chamber and having a portion engaged to said engaging portion.

It is preferable for a drive unit for rotating a rotational member around a base to comprise: a shaft body secured to said base and having an engaging portion on the outer surface thereof; a rotational member journalled rotatively around said shaft body; an operation chamber provided for said rotational member; and reciprocating means reciprocatively held in the lengthwise direction of said operation chamber and having a portion engaged to said engaging portion. The rotational member has a drive cylinder chamber for use in only driving operations and individually from said operation chamber, a drive piston is reciprocatively disposed in said drive cylinder chamber and the reciprocating motion of said drive piston and the motion of said reciprocating member are connected to each other.

As a result, when the leading portion of the piston rod projecting over one of the holes collides with an object and then moves, the shock absorbing means absorbs the motion at a moment at which the leading portion of the other piston rod is stopped in the other hole portion.

When a rod of a pair of pistons each having a rod slidably formed in a cylindrical portion of a body having an orifice portion between cylinders and making the operating fluid to be liquid-hermetical collides with an object and then moves, the shock absorbing means causes the operating fluid to pass through the orifice to absorb the shock at the collision.

Furthermore, by adjusting the rotating operation of the orifice portion fastened in a liquid hermetical manner in a direction substantially perpendicular to the lengthwise direction of the body by rotation, the area of the orifice is changed and the flow rate of the operating fluid can be adjusted, so that the quantity of the shock absorption is adjusted.

The rise of the temperature of the operating fluid is prevented by means of the radiating portion formed on the outer surface of the body.

The rotation drive unit having the shock absorbing apparatus includes the shock absorbing apparatus as a movable body which is moved by a medium supplied from the two end portions of the cylinder portion. Therefore, when the movable body moves, the rack engaged to the pinion gear moves to rotate the rotational member, and the shock absorbing apparatus (movable body) collides with the inner wall of the cylinder portion after the rotation to absorb the shock.

The shock absorbing apparatus thus structured is arranged in such a manner that the shock absorbing means for absorbing the shock generated at the positions at which the piston stops at the two end portions in the cylinder is included by the piston which reciprocates in synchronization with the drive member. Therefore, the overall size of the apparatus can be reduced if the shock absorbing means is employed. Furthermore, a common component can be adapted to the two stop positions and thereby the weight of the apparatus can be reduced as compared with a structure in which two shock absorbing apparatuses are provided at the two stop positions.

Other and further objects, features and advantages of the invention will be appear more fully from the following description.

BRIEF DESCRIPTION OF THE DRAWINGS

FIG. 15 is a vertical cross sectional view which illustrates a state where the performance changing member of a shock absorbing mechanism is fastened;

FIGS. 16A and 16B respectively are a perspective view which illustrates the detailed shape of the formed orifice shown in FIG. 15 and a front elevational view including a cross section in part;

FIGS. 19A and 19B respectively are a horizontal cross sectional view and a vertical cross sectional view which illustrate the conventional structure of the rotation drive unit.

DESCRIPTION OF THE PREFERRED EMBODIMENTS

Figure 1:
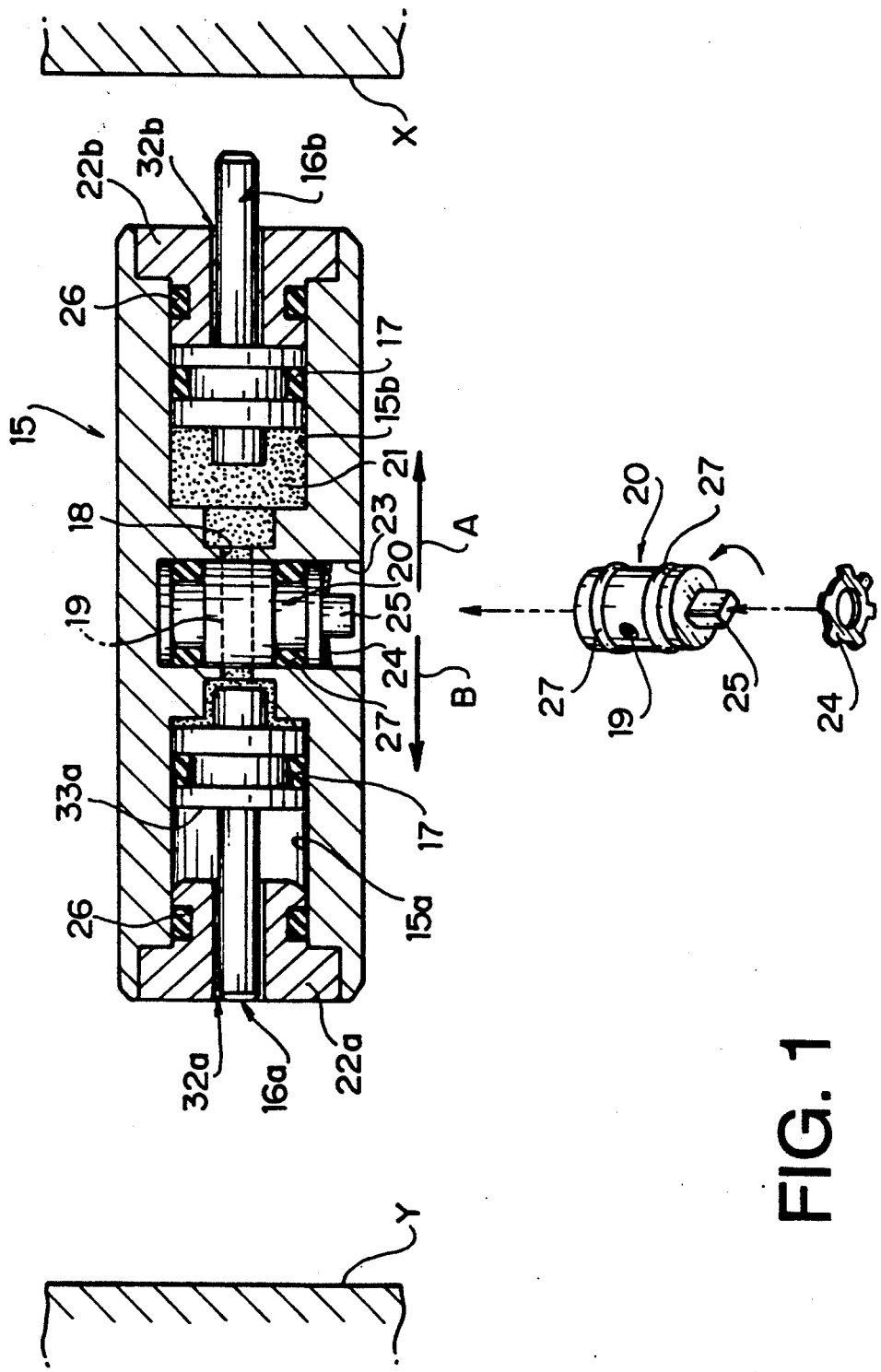
FIG. 1 is a central cross sectional view which illustrates a shock absorbing apparatus according to a first embodiment.

A first embodiment of a shock absorbing apparatus according to the present invention will now be described with reference to the drawings. FIG. 1 is a central cross sectional view which illustrates the shock absorbing apparatus including an orifice valve 20 which is inserted from a side position as an individual element.

Referring to FIG. 1, an outer cylinder 15 of the shock absorbing apparatus has opposing stepped holes 15a and 15b formed from the end surfaces thereof. As a result, pistons 16a and 16b are able to slide in the holes 15a and 15b while hermetically coming in contact with the same by a packing 17.

The stepped holes 15a and 15b are connected to each other by a conduit 18 which has, at the central portion thereof, an orifice valve 20 having an orifice 19. The stepped holes 15a, 15b and the conduit 18 closed by the pistons 16a and 16b are filled with an operating fluid 21 as designated by a multiplicity of dots shown in FIG. 1.

Stopper caps 22a and 22b are inserted and secured to cover the stepped holes 15a and 15b positioned at the two end surfaces of the outer cylinder 15. As a result, they also serve stoppers which act at the time of restricting the quantity of the reciprocating motion.

Figure 2:
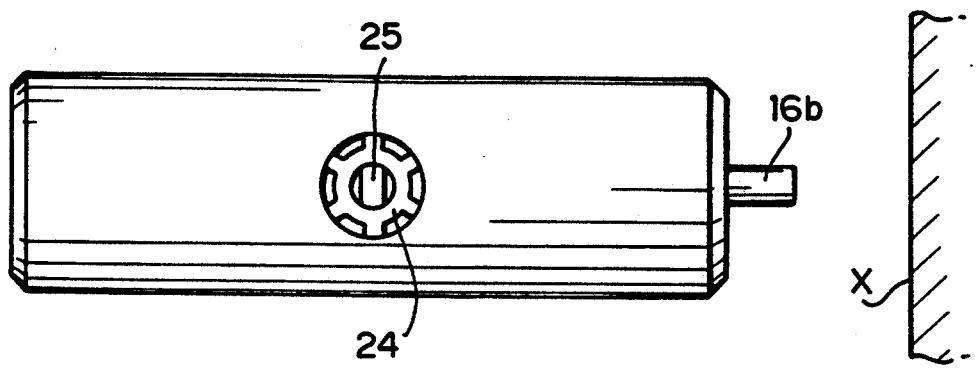
FIG. 2 is a bottom view which illustrates the shock absorbing apparatus.

The orifice valve 20 is inserted into a valve hole 23 formed at the lengthwise center of the outer cylinder 15. The orifice valve 20 is held by a push nut 24, so that its separation is prevented. FIG. 2 is a bottom view of FIG. 1 illustrating a state of the orifice valve 20 the separation of which is prevented by the push nut 24.

Since the structure is arranged as described above, the rotation of a button 25 integrally formed with the orifice valve 20 will change an area (an orifice area) in which the orifice 19 and the conduit 18 are fastened to each other. By changing the aforesaid area, the flow rate of the operating fluid 21 can be controlled and thereby the quantity of the shock absorption can be adjusted.

Referring to FIG. 1, reference numerals 26 and 27 represent packings for hermetically sealing the operating fluid 21 in the outer cylinder 15.

In the structure thus arranged, if the shock absorbing apparatus is moved and thereby the piston 16b is pushed inwards due to the collision with an object X, the operating fluid 21 filled in the stepped hole 15b passes through the conduit 18, the orifice valve 20 and the hole of the inner orifice 19 to absorb the shock and act to outwards push the opposing piston 16a. As a result, the shock can be absorbed.

Then, an embodiment in which the shock absorbing apparatus is used in a rotation drive unit will now be described with reference to FIGS. 3 to 7.

Figure 3:
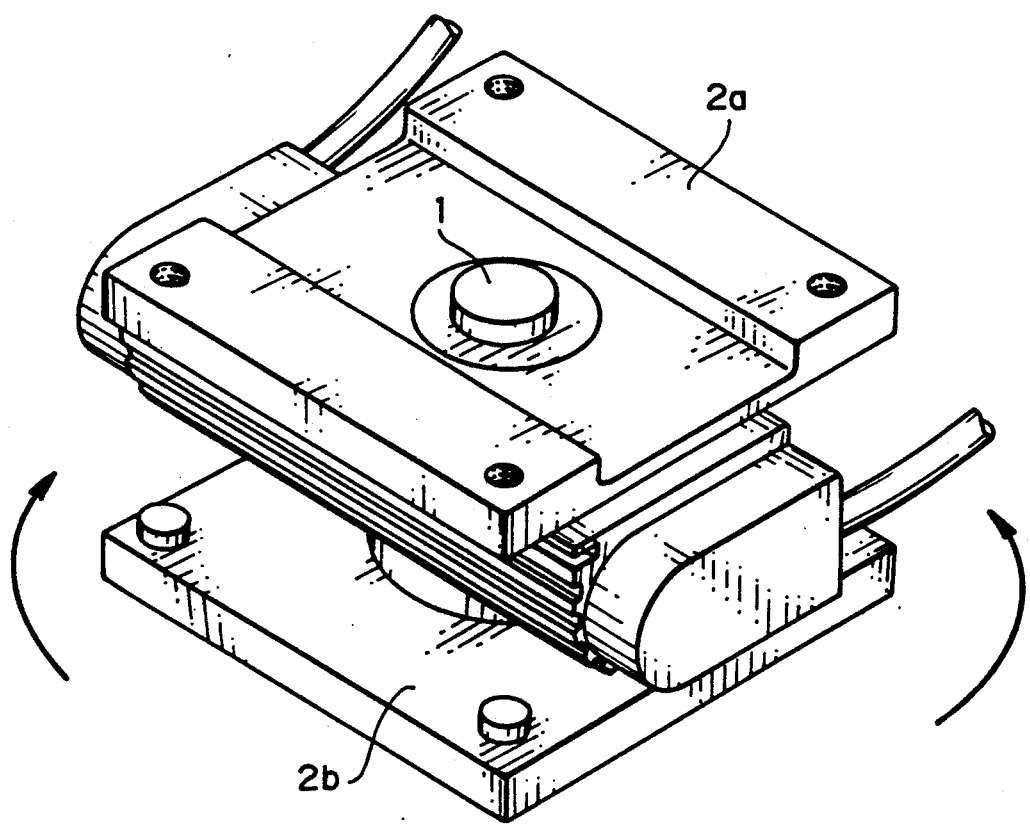
FIG. 3 is a perspective schematic view which illustrates a rotation drive unit.
Figure 4:
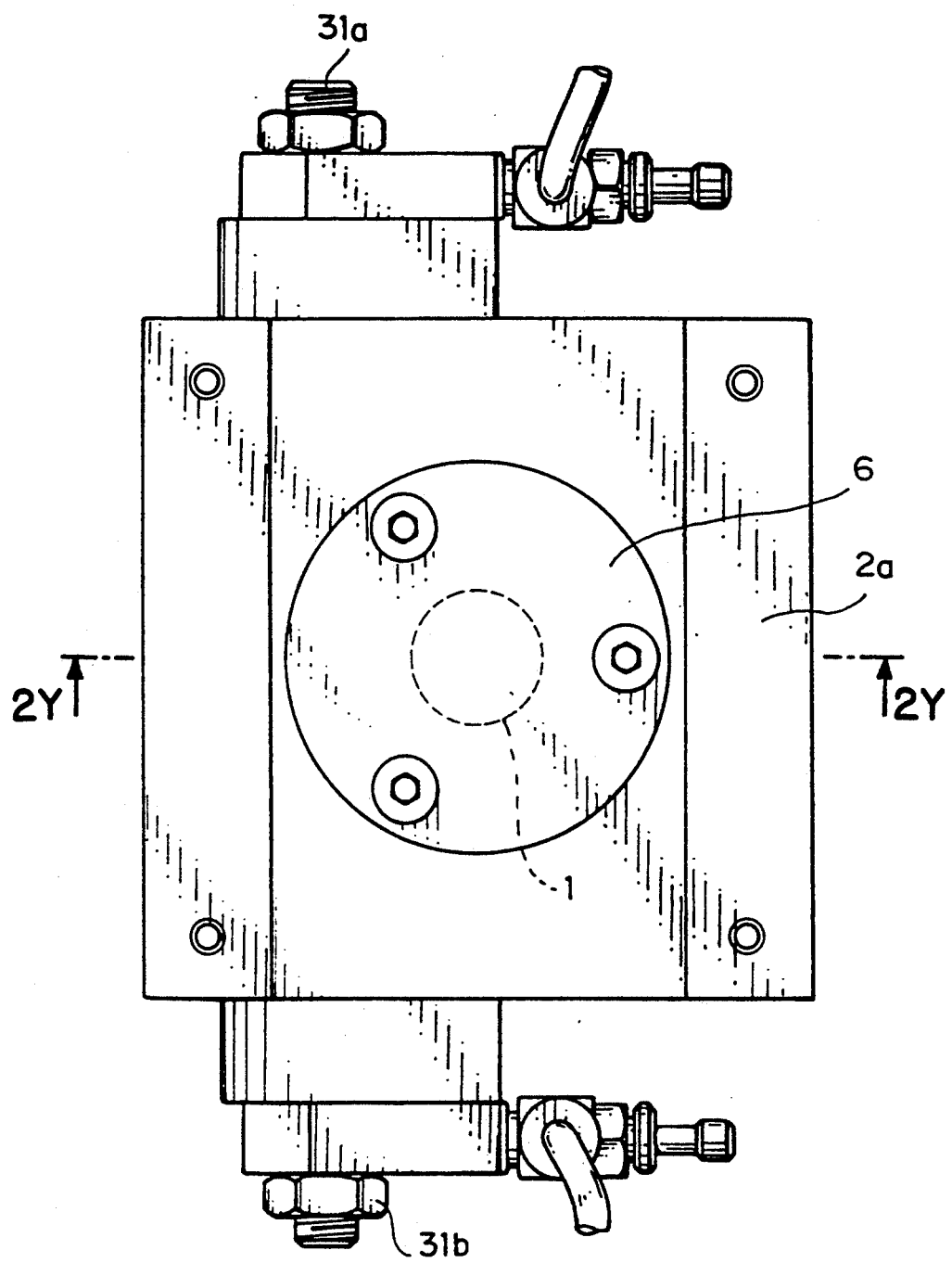
FIG. 4 is a plan view which illustrates the rotation drive unit.
Figure 5:
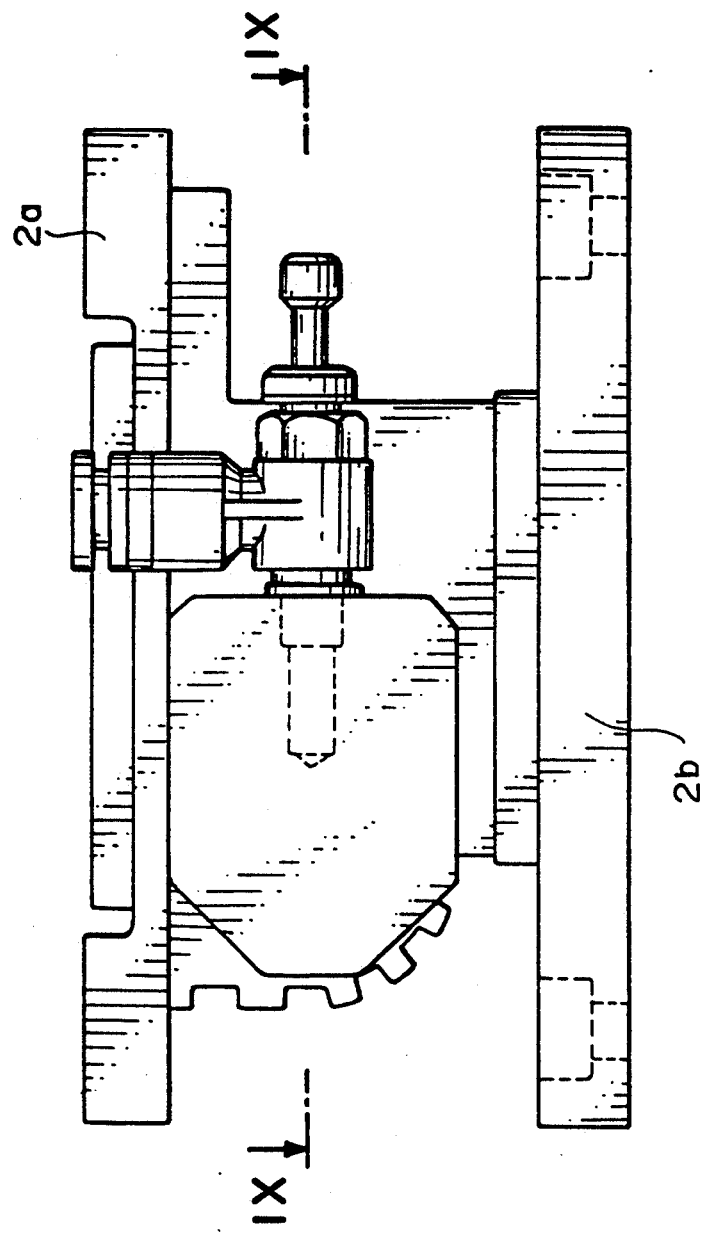
FIG. 5 is a side elevational view which illustrates the rotation drive unit.
Figure 6:
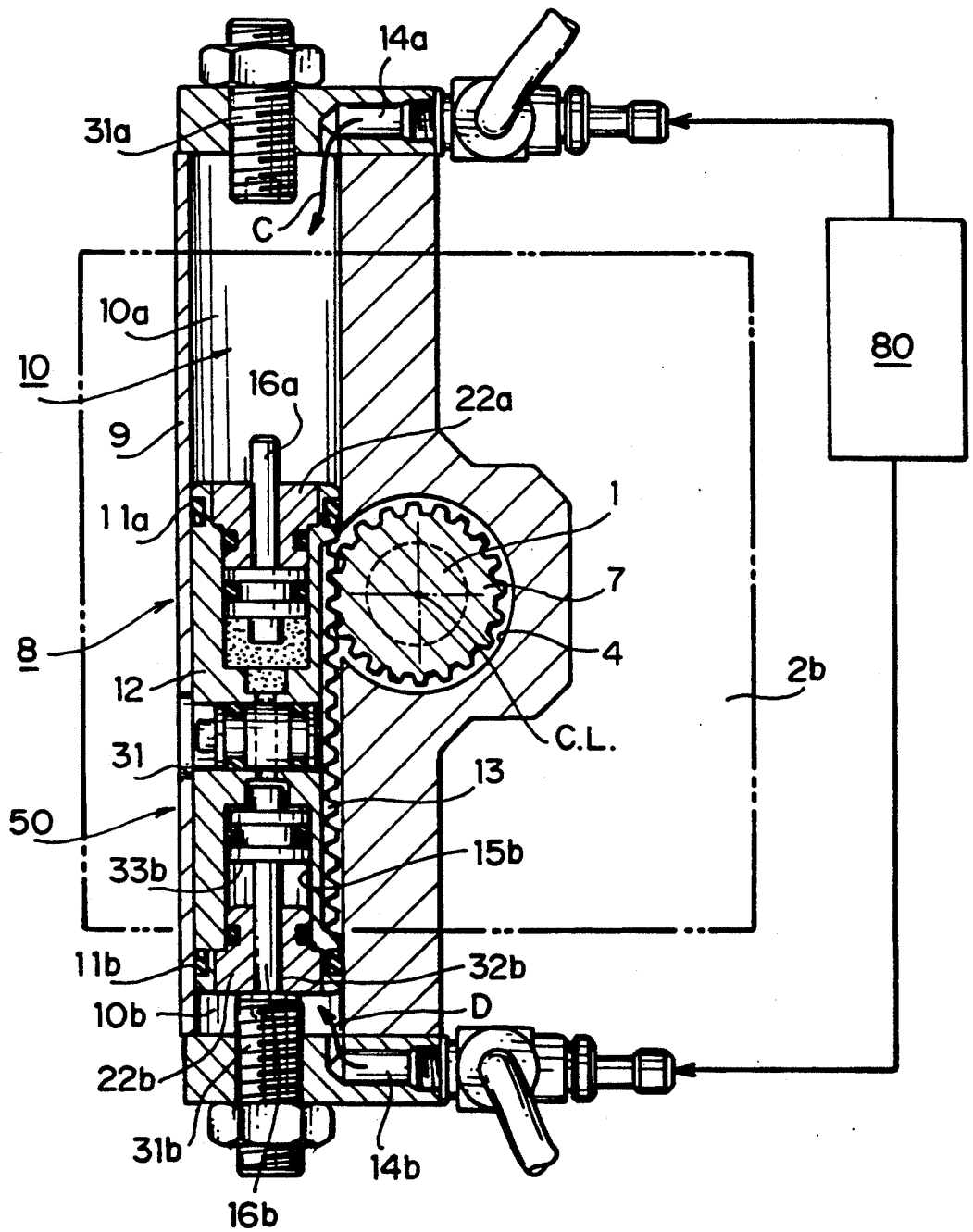
FIG. 6 is a cross sectional view taken along line 1X—1X.
Figure 7:
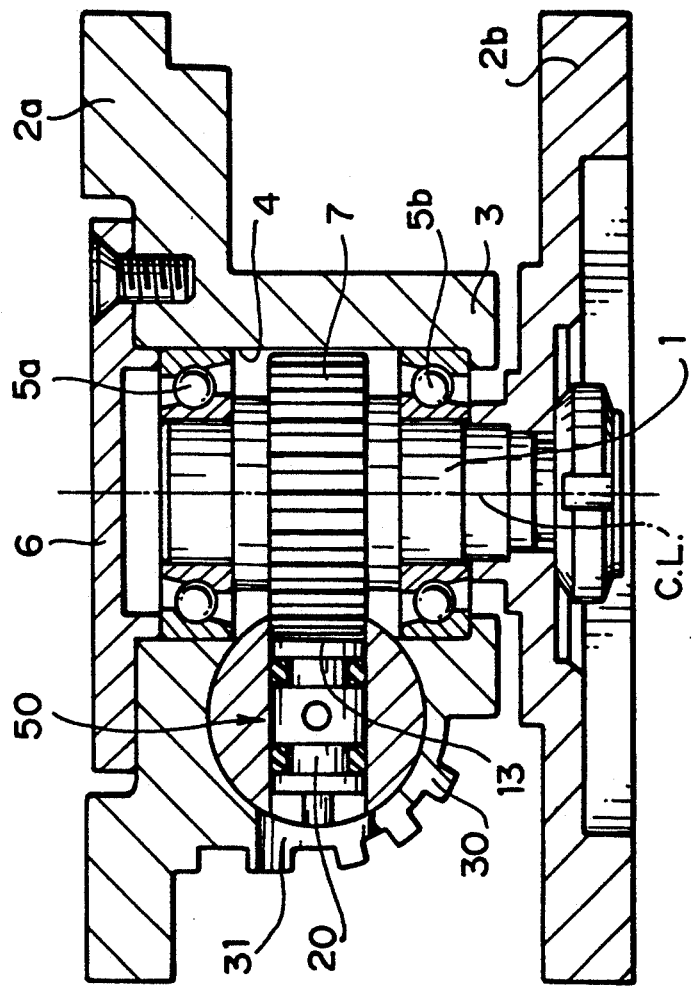
FIG. 7 is a cross sectional view taken along line 2Y—2Y.

FIG. 3 is a schematic perspective view which illustrates the rotation drive unit, FIG. 4 is a plan view which illustrates the rotation drive unit, FIG. 5 is side elevational view which illustrates the rotation drive unit, FIG. 6 is a cross sectional view taken along line 1X—1X of FIG. 5, and FIG. 7 is a cross sectional view taken along line 2Y—2Y of FIG. 4.

As shown in FIGS. 3 to 7, the rotation drive unit according to this embodiment has a pair of vertically disposed mounting bases 2a and 2b which can be relatively rotated around a drive shaft 1 which is disposed on the central axial line of the rotation drive unit.

The central portion of the lower surface of the upper mounting base 2a has a body portion 3 formed integrally therewith in such a way that the body portion 3 projects downwards. The central portion of the body portion 3 has a penetrating hole 4 which penetrates the same vertically. The aforesaid drive shaft 1 is secured to the top surface of the lower mounting base 2b in a state where the same is rotatively supported by a pair of bearings 5a and 5b while being vertically inserted into the penetrating hole 4.

The drive shaft 1 has, on the top end portion thereof, a plate 6 for the purpose of preventing the downward separation of the drive shaft 1 from the penetrating hole 4.

A pinion gear 7 is coaxially fastened to the outer surface of the central portion of the drive shaft 1 in such a way that the pinion gear 7 can be rotated integrally with the drive shaft 1. As shown in FIG. 7, the aforesaid body portion 3 has an air cylinder mechanism 8 for rotating the drive shaft 1. The air cylinder mechanism 8 has a cylinder body 9 formed integrally with the body portion 3, the cylinder body 9 extending in a direction perpendicular to the drive shaft 1. The cylinder body 9 includes a cylinder chamber 10 extending in a direction perpendicular to the drive shaft 1.

The cylinder chamber 10 accommodates a pair of pistons 11a and 11b integrally connected to each other via a piston rod 12 in such a manner that the pistons 11a and 11b are able to slide while maintaining hermetical state. The cylinder chamber 10 is, at the central portion thereof, opened so as to be communicated with the penetrating hole 4. The piston rod 12 has a rack 13 engaged to the aforesaid pinion gear 7 in the aforesaid opened portion.

A portion of the cylinder chamber 10 outside of the piston 11a is sectioned so as to form a sectioned cylinder chamber 10a, while a portion of the cylinder chamber 10 outside of the other piston 11b is sectioned so as to form another sectioned cylinder chamber 10b.

The aforesaid sectioned cylinder chambers 10a and 10b respectively are, at the outer end portions thereof, connected to compressed air introducing passages 14a and 14b into which operating compressed air is introduced. As a result, compressed air for operating is introduced into the sectioned cylinder chamber 10a through the compressed air introducing passage 14a. Therefore, as shown in FIG. 6, the two pistons 11a and 11b are brought to a lower portions in the cylinder chamber 10 while being connected to each other by the piston rod 12 when viewed in FIG. 5. As a result, the lower mounting base 2b is rotated counterclockwise around the drive shaft 1 relatively to the position of the upper mounting base 2a.

When compressed air for operating is introduced into the other sectioned cylinder chamber 10b through the other compressed air introducing passage 14b, the two pistons 11a and 11b are brought to upper portions in the cylinder chamber 10 while being connected to each other by the piston rod 12 when viewed in FIG. 1. As a result, the lower mounting base 2b is rotated clockwise around the drive shaft 1 relatively to the position of the upper mounting base 2a.

Usually, a setting is made in such a manner that compressed air for operating is introduced into the other sectioned cylinder chamber 10a through the other compressed air introducing passage 14a via a change valve (omitted from illustration) in the non-rotational mode. As a result, the lower mounting base 2b is urged to be rotated counterclockwise relatively to the upper mounting base 2a. The aforesaid two compressed air introducing passages 14a and 14b selectively receive compressed air for operating by the action of a change valve (omitted from illustration).

As shown in the drawings, a shock absorbing apparatus 150 according to the present invention is included in the piston 12 for rotating, so that it absorbs shock generated at the time of the reciprocating motion performed by the piston 12.

Furthermore, radiating fins 30 are formed around the outer surface of a portion of the body portion 3 in which the penetrating hole 10 is formed so as to radiate heat generated at the time of absorbing shocks.

The quantity of the shock absorption can be adjusted from outside by rotating an adjustment button 25 through an adjustment hole 31 formed on the side surface of the radiating fins of the body portion 3, the quantity being adjustable according to the load.

As shown in FIG. 6, the holes of the stopper caps 22a and 22b through which the pistons 16a and 16b passes have gaps 32a and 32b. Referring to FIG. 6, compressed air for operating is introduced into the compressed air introducing passage 14b from an air generating device 80 in directions designated by arrows C and D to press a piston surface 33b with the same pressure via the gap 32b between the sectioned cylinder chamber 10b and the stopper cap 22b for the end surface of the piston. As a result, the rack 13 is moved upwards when viewed in FIG. 6. All of the compressed air for operating acts on the end surface of the piston rod 12 until the piston 16a comes in contact with the stopper bolt 31a. In a period in which the stopper cap 22a and the stopper bolt 31a come in contact with each other when the piston rod 16a is pushed inwards, the inward pushing force of the compressed air for operating to be acted on the piston surface 33b is reduced. As a result, the shock can further be absorbed at the end point of the rotating operation.

Since the rotation drive unit is constituted as described above, the rack 13 is moved downwards when viewed in FIG. 6 in a state where the compressed air is introduced into the upper sectioned cylinder chamber 10a. Therefore, the pinion gear 7 which is engaged to the rack 13 is rotated counterclockwise, causing a stopper block 22b of the shock absorbing apparatus 150 included in the piston 12 to come in contact with a stopper adjustment screw 31b as shown in the drawing, the rotational angle of the base 2b can be defined.

This embodiment is arranged in such a manner that the lower mounting base 2b aligns to the upper mounting base 2a in a state where another stopper block 19b is positioned in contact with a stopper screw 21b.

When a change valve (omitted from illustration) is switched in a state of the rotation drive unit shown in FIG. 6, compressed air is introduced into the upper sectioned cylinder 10b. As a result, the rack 13 is pushed upwards, causing the pinion gear 7 engaged to the rack 13 to be rotated clockwise. Therefore, the stopper block 22a of the shock absorbing apparatus 150 (shock absorber) included in the piston 12 comes in contact with the stopper adjustment screw 31a. As a result, the rotational angle of the base 2b can be defined.

According to this embodiment, the lower mounting base 2b is rotated relatively to the upper mounting base 2a by a clockwise rotational angle of 90° when viewed from an upper portion in a state where the stopper block 22a is positioned in contact with the corresponding stopper screw 31a.

Although the aforesaid embodiment is described about the air cylinder which is operated by air pressure, a variety of operating mediums such as hydraulic pressure and a special gas may, of course, be used. Furthermore, the present invention may be applied to a system composed of a plurality of apparatuses or a system composed of a single apparatus.

As described above, the shock absorbing apparatus according to the present invention is able to absorb shock in two directions while using a simple structure. Therefore, the shock absorbing apparatus according to the present invention can be disposed in the cylinder piston which enables the reciprocating motion to be performed. Therefore, it can be included in a mechanical device, the size and the weight which can be reduced and the quantity of the shock absorption can be adjusted in a state where the same is included in the apparatus.

Since the shock absorbing apparatus is made to be included in a movable body, dust and cutting dust or the like generated in the stopper contact portion, the sliding portions in the shock absorbing apparatus and contact portions do not diffuse outwards. Therefore, a satisfactory effect can be obtained in a case where it is used as a shock absorbing apparatus for a rotation drive unit for use in a clean space such as a clean room.

If an air damper function is added to act at the end point of the rotating operation, the shock can be smoothly absorbed as well as the flow rate adjustment function.

As described above, according to the present invention, a shock absorbing apparatus with a reduced size and weight can be provided. Furthermore, a shock absorbing apparatus which further functions of to adjust the quantity of shock absorption and the size and weight of which can be reduced can be provided.

Furthermore, the shock absorbing apparatus can be used as a movable body, causing a rotation drive unit the size, weight and cost of which can be reduced to be provided.

Then, a second embodiment of the shock absorbing apparatus according to the present invention will now be described with reference to FIGS. 8 to 13, in which the present invention is applied to a rotation drive unit for use in a hand apparatus for a robot.

Since the detailed structure of the hand apparatus has been described in detail in a prior application filed by the same applicant as that of the present invention and titled as "METHOD OF SELECTING HAND MECHANISM OF ROBOT") (Japanese Laid-Open Patent Application No. 4-13583 published on Jan. 17, 1992), description will be made about only a rotation drive unit comprising a rotational module $M_3$ having the shock absorbing apparatus according to the present invention.

First, a rotation drive unit 100 for causing the hand mechanism to rotate around the central axis will now be described. As shown in FIGS. 8 to 13, the rotation drive unit 100 has a pair of mounting bases 114 and 116 disposed vertically and capable of rotating relatively to each other around a drive shaft 112 extending to coincide with the central axis of the rotation drive unit 100.

Figure 11:
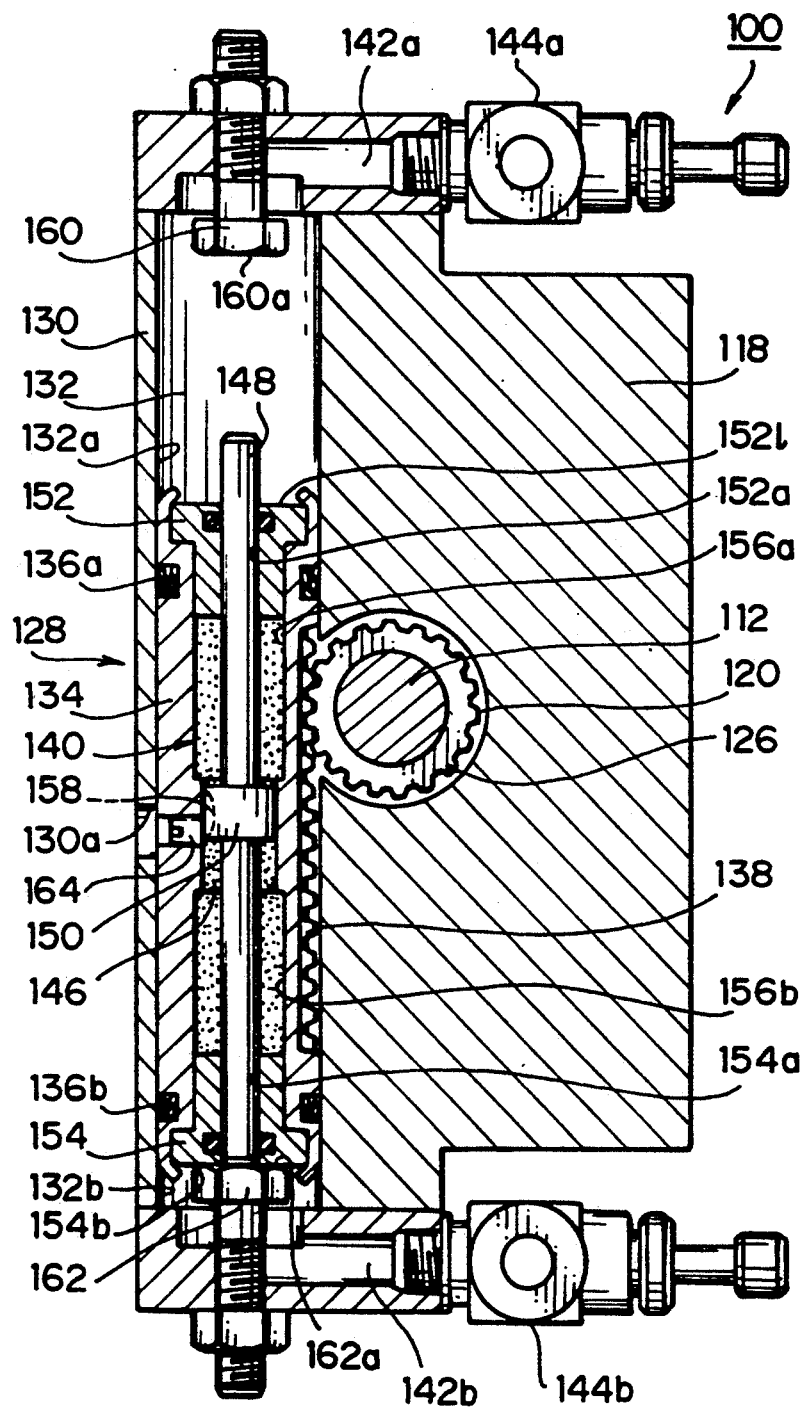
FIG. 11 is a horizontal cross sectional view which illustrates the rotation drive unit while cutting it along line 3X—3X shown in FIG. 9.
Figure 13:
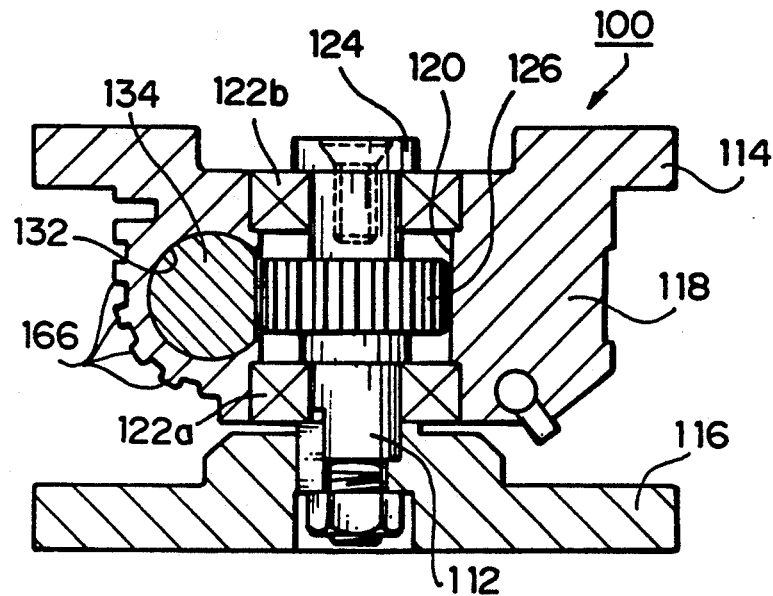
FIG. 13 is a vertical cross sectional view taken along Line 4Y—4Y of FIG. 10 and illustrating the rotation drive unit.

The upper mounting base 114 is used as the body portion on which another module is mounted. The upper mounting base 114 has, in the central portion of the lower surface thereof, a body portion 118 projecting downwards and formed integrally with the central portion. The body portion 118 has a penetrating hole 120 at the central portion thereof, the penetrating hole 120 vertically penetrating the body portion 118 as shown in FIGS. 11 and 13.

The aforesaid drive shaft 112 vertically penetrates the penetrating hole 120 and is secured to the top surface of the lower mounting base 116 while being rotatively supported via a pair of bearings 122a and 122b. The lower mounting base 116 is fastened to another module to be mounted on the lower mounting base 116. The lower mounting base 116 serves as a rotational member acting relatively to the upper mounting base 114. Furthermore, the drive shaft 112 has a plate 124 fastened to the top end portion thereof in order to prevent the downward separation of the drive shaft 112 from the penetrating hole 120.

A pinion gear 126 is coaxially fastened to the outer surface of the central portion of the drive shaft 112 in such a way that the pinion gear 126 can be rotated integrally with the drive shaft 112. As shown in FIG. 11, the aforesaid body portion 118 has an air cylinder mechanism 128 for rotating the drive shaft 112. The air cylinder mechanism 128 has a cylinder body 130 formed integrally with the body portion 118, the cylinder body 130 extending in a direction perpendicular to the drive shaft 112. The cylinder body 130 includes a cylinder chamber 132 defined by a cavity extending in a direction perpendicular to the drive shaft 112.

The cylinder chamber 10 accommodates a piston 134 in such a manner that it is able to slide while maintaining a hermetical condition via a pair of sealing rings 136a and 136b. The cylinder chamber 132 is opened so as to be communicated with the penetrating hole 120 at the central portion of the cylinder chamber 132. The piston 134 has, at an end portion thereof, a rack 138 engaged to the pinion gear 126 via the aforesaid opening. The piston 134 includes a shock absorbing mechanism 140 which absorbs shocks generated at the position at which the movement of the piston 134 is stopped and which is the feature of the present invention. The structure of the shock absorbing mechanism will be described later.

The cylinder chamber 132 is bisectioned by the piston 134 into a space formed above the piston 134 when viewed in FIG. 12 and defined to be a sectioned cylinder chamber 132a and a space formed below the piston 134 and defined to be a sectioned cylinder chamber 132b.

The two sectioned cylinder chambers 132a and 132b respectively are, at the outer end portions thereof, connected to compressed air introducing passages 142a and 142b into which compressed air for operating and serving as operating fluid for sliding and driving the piston is introduced. The compressed air introducing passages 142a and 142b respectively have compressed air inlet ports 144a and 144b formed therein. The compressed air inlet ports 144a and 144b are connected to a source for generating compressed air (omitted from illustration) through connecting tubes (omitted from illustration).

Since compressed air for operating is introduced into the sectioned cylinder chamber 132b via the compressed air introducing passage 142b, the piston 134 is moved upwards in the cylinder 132 from a state shown in FIG. 11. As a result, a state shown in FIG. 12 is realized. According to the movement of the piston 134, the drive shaft connected to the piston 134 is rotated clockwise around the central axis thereof. As a result, the lower mounting base 116 to which the drive shaft 112 is secured is rotated clockwise when viewed in the drawing around the drive shaft relatively to the position of the upper mounting base 114.

Since compressed air for operating is introduced into the other sectioned cylinder chamber 132a through the other compressed air introducing passage 142a, the piston 134 is moved downwards when viewed in FIG. 13. Therefore, the state shown in FIG. 11 is again realized. The lower mounting base 116 is rotated couterclockwise when viewed in the drawing around the drive shaft 112 relatively to the position of the upper mounting base 114.

Usually, a setting is made in such a manner that compressed air for operating is introduced into the other sectioned cylinder chamber 132b through the other compressed air introducing passage 142b via a change valve (omitted from illustration). As a result, the lower mounting base 116 is given a clockwise rotational force relatively to the upper mounting base 114. The two compressed air introducing passages 142a and 142b are arranged to selectively receive compressed air for operating by the action of a change valve (omitted from illustration).

The structure of the shock absorbing mechanism 140 will now be described with reference to FIGS. 11, 12, 15 and 16.

As described above, the shock absorbing mechanism 140 is included in the piston 134 which has a central hole 146 which penetrates the piston 134 in its axial direction. The central hole 146 accommodates a piston rod 148 serving as a shock absorbing member in such a manner that each end of the piston rod 148 is able to project outwards from the piston 134 in the axial direction of the piston 134. The piston rod 148 has, at the central portion thereof, a partition wall 150 for bisecting an internal space defined by the inner surface of the central hole 146, the partition wall 150 being integrally formed with the piston rod 148. That is, the partition wall 150 has an outer surface which is able to slide on the inner surface of the central hole 146.

Figure 17A:
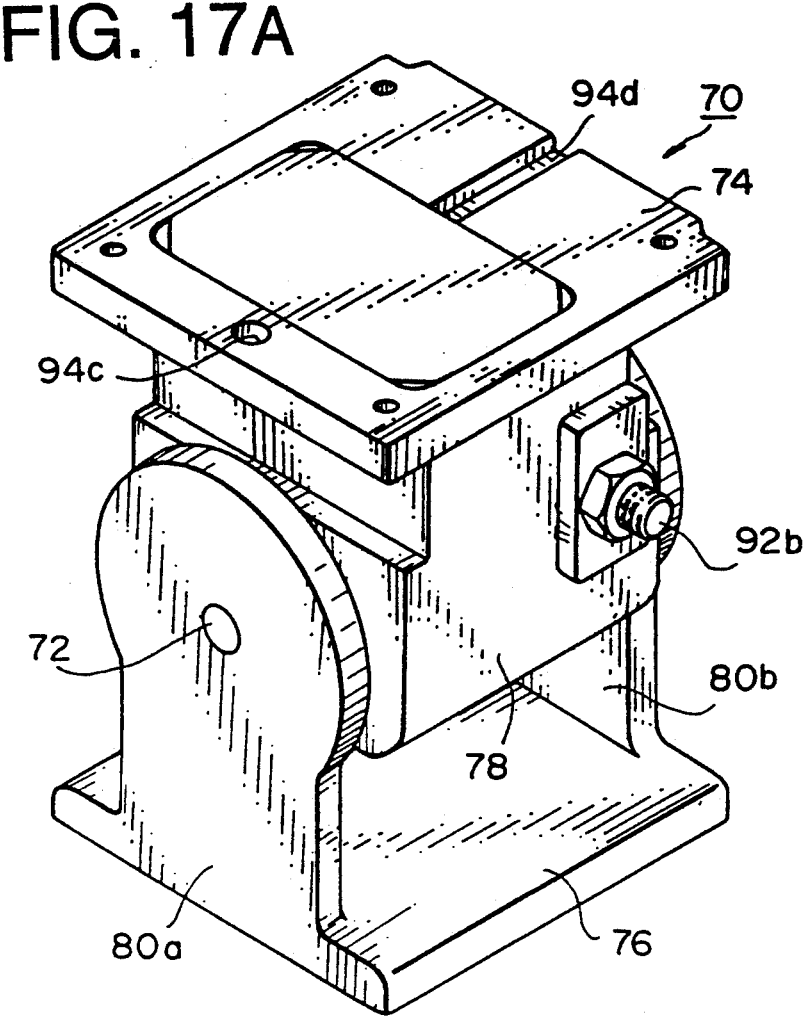
FIG. 17A is a perspective view which illustrates the structure of a reverse drive unit which serves as an applicable example of the shock absorbing apparatus according to the present invention.
Figure 17B:
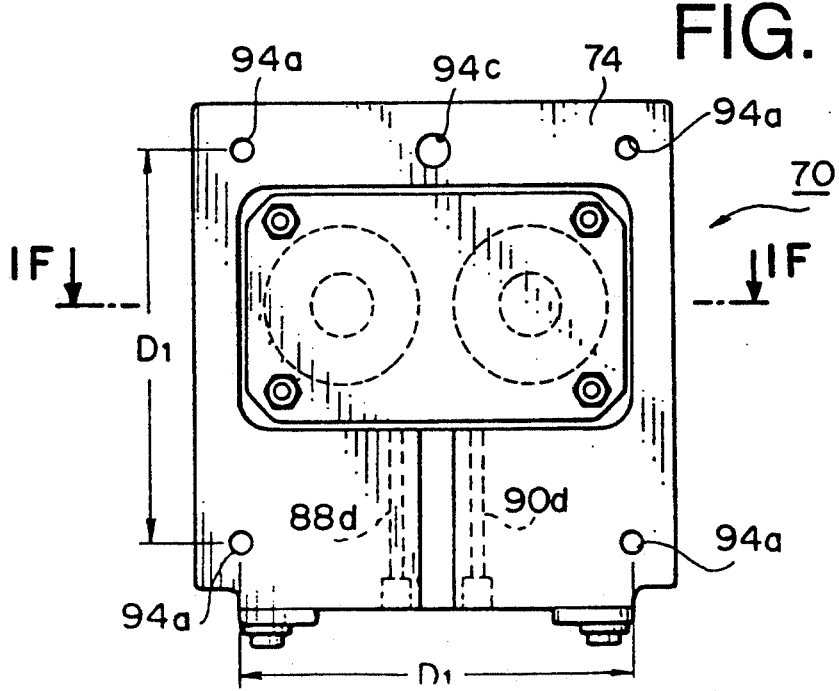
FIGS. 17B to 17D respectively are a top view, front elevational view and a bottom view which illustrate the reverse drive unit shown in FIG. 17A.
Figure 17C:
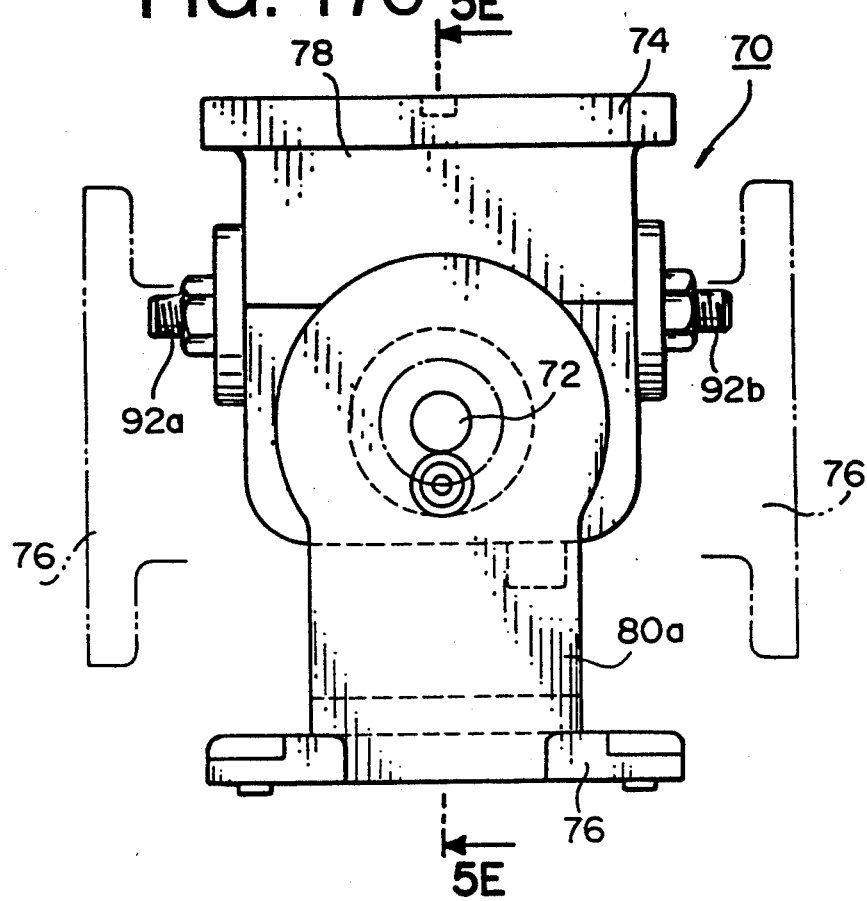
Figure 17D:
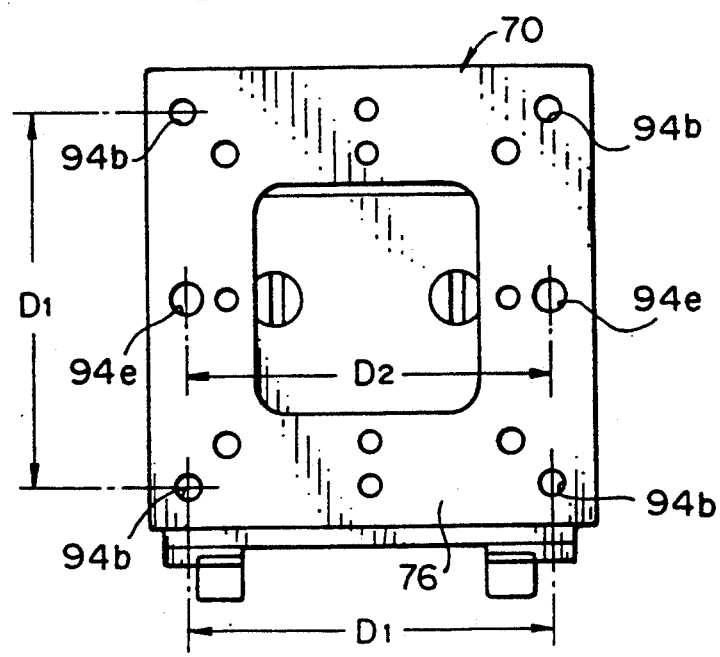

The cross-sectional shape of the portion of the central hole 146 along which the partition wall 150 slides is, as shown in FIG. 15, formed into a substantially circular shape having a flat portion partially. The outer shape of the partition wall 150 is, as shown in FIG. 17A, formed into a complementary shape for the inner surface of the central hole 146 for the purpose of coming in contact with the overall inner surface of the central hole 146. That is, the partition wall 150 is composed of a circular arc portion 150a which comes in contact with the circuit arc portion of the central hole 146 and a flat portion 150b which comes in contact with the flat portion of the central hole 146.

Since the slide surfaces of the two elements are constituted while having a flat portion in part, the undesirable rotation of the piston rod 148 in a direction around its central axis is inhibited when the piston rod 148 slides in the central hole 146.

On the other hand, the piston rod 134 has, at the two end portions thereof, stopper blocks 152 and 154 serving as closing members for closing the central hole 146. The aforesaid stopper blocks 152 and 154 acts to hermetically seal the space in the central hole 146. The aforesaid stopper frames 152 and 154, of course, have through holes 152a and 154a through which the piston rod 148 passes.

A space surrounded by the inner surfaces of the two stopper blocks 152 and 154 and the inner surface of the central hole 146 creates a shock absorbing chamber 156 to be filled with a shock absorbing agent, for example, shock absorbing oil. The aforesaid shock absorbing chamber 156 is bisectioned into a sectioned shock absorbing chamber 156a and another sectioned shock absorbing chamber 156b by the aforesaid partition wall 150.

The partition wall 150 has, on the outer surface thereof, more particular, on the flat portion 150b, an orifice 158 for allowing the shock absorbing oil to pass through between the two sectioned shock absorbing chambers 156a and 156b, the orifice 158 being formed into a narrow groove running in the axial direction of the partition wall 150.

The cylinder bodies 130 located at the two end portions of the cylinder chamber 132 have stopper pins 160 and 162 the positions of which can be adjusted, the stopper pins 160 and 162 being screwed so as to be fastened. The end surfaces of the piston 134, specifically, stopper surfaces 152b and 154b respectively defined by the outer end surfaces of the stopper blocks 152 and 154 are brought into contact with inner surfaces 160a and 162a of the stopper pins 160 and 162. Thus, the stopper pins 160 and 162 serve as position restricting surfaces for controlling the positions at which the piston 134 is stopped. By rotating the aforesaid stopper pins 160 and 162 from outer positions, the stopper pins 160 and 162 move forwards/rearwards in their axial directions. As a result, predetermined positions of the stopper pins 160 and 162, that is the positions at which the piston 134 are stopped can be adjusted/changed.

As shown in FIG. 11, the portions at which the aforesaid compressed air introducing passages 142a and 142b are opened in the cylinder chamber 132 are made adjacent to the positions at which the corresponding stopper pins 160 and 162 are disposed.

Figure 12:
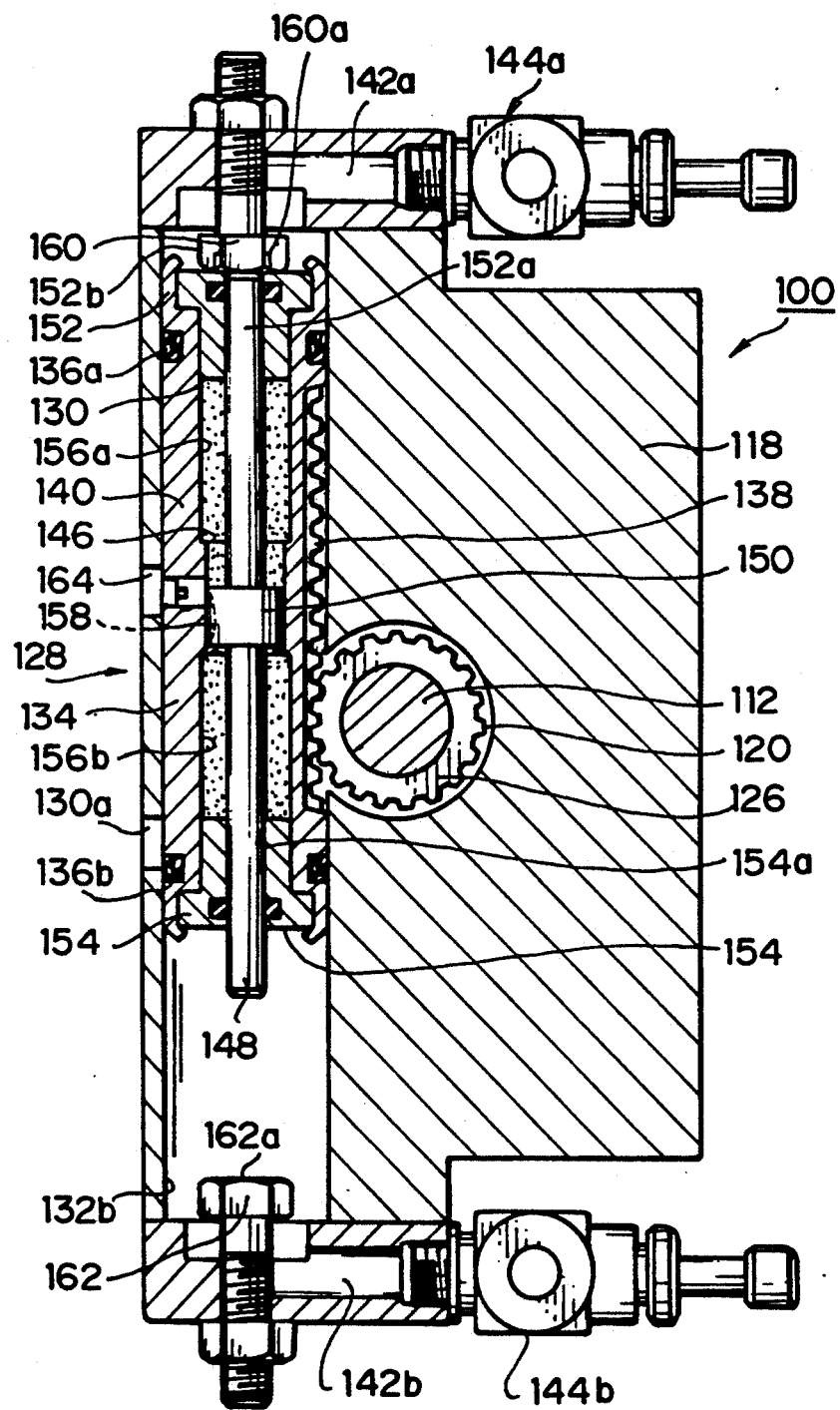
FIG. 12 is a horizontal cross sectional view which illustrates the rotation drive unit in a state in which its piston has been moved.

The piston 134 slides and moves from a position shown in FIG. 11 toward a position shown in FIG. 12 when compressed air is introduced into the other second cylinder chamber 132b through the other compressed air introducing passage 142b. The aforesaid movement of the piston 134 is stopped when the stopper surface 152b which is the outer surface of the stopper block 152 positioned at one end portion of the piston 134 comes in contact with the position restricting surface 160a of the stopper pin 160.

On the other hand, the aforesaid orifice 158 has a performance changing member 164 for changing the shock absorbing performance by changing the cross-sectional area of the fluid passage of the orifice 158, the performance changing member 164 being screwed to the outer surface of the piston 134 in such a manner that it is able to move forwards/rearwards. That is, in a state where a leading portion 164a of the performance changing member 164 is completely introduced into the piston 134 and the same does not project into the orifice 158, the overall cross-sectional area of the fluid passage of the orifice 158 is completely opened. As a result, the shock absorbing performed becomes minimum. On the other hand, when the leading portion 164a of the performance changing member 164 is introduced into the orifice 158, the cross-sectional area of the fluid passage of the orifice is gradually reduced according to the quantity of the introduction. Therefore, the shock absorbing performance is gradually improved.

The performance changing member 164 is set in such a manner that its head portion 164b appears outside. Furthermore, as shown in FIG. 12, the outer surface of the cylinder body 130 has an access opening 130a in order to allow the head portion 164b of the performance changing member 164 to be freely accessed from an outer position in a state where the stopper surface 152b of the stopper block 152 of the piston 134 is positioned in contact with the adjacent (that is, in the lower portion) position restricting surface 160a of the stopper pin 160. The shock absorbing performance of the shock absorbing mechanism 140 can be changed by the operator simply by rotating the head portion 164b which appears outside the performance changing member 164 through the access opening 130a so as to move forwards/rearwards the leading portion 164a of the performance changing member 164 relatively to the position of the orifice 158.

The orifice 158 is arranged in such a manner that it changes the cross-sectional area of the fluid passage of the orifice 158 along the axial direction as shown in FIG. 16B. That is, as shown in FIG. 16B, the depth of the orifice 158 is made to be a shallow value $h_1$ at the two end portions of the orifice 158, while the same is made to be a deep value $h_2$ at the central portion of the orifice 158. As a result, if the state in which the performance changing member 164 projects is made constant, the cross-sectional area of the passage is made to be relatively large at an intermediate position in the range in which the piston 134 moves. As a result, the shock absorbing performance is restricted, that is the movement resistance is made to be a small value. Therefor, the movement of the piston 134, that is the rotating operation can be smoothly executed since the resistance is restricted. However, when the piston 134 approaches either of the two end portions of the movement range, that is, the region in which the piston 134 is stopped, the cross-sectional area of the fluid passage is gradually decreased. As a result, the movement resistance is enlarged, that is the shock absorbing performance is improved. Thus, the piston 134 can be softly stopped thanks to the satisfactory shock absorbing performance exhibited after the movement.

Since the shock absorbing mechanism 140 is constituted as described above, the leading portion of the piston rod 148 of the shock absorbing mechanism 140 comes in contact with the position restricting surface 160a prior to the contact of one of the stopper surface 152b of the piston 134 with the position restricting surface 160a of one of the stopper pin 160. When the piston 134 further approaches the stopper pin 160, the piston rod 148 is relatively introduced into the piston 134.

When the piston rod 148 is introduced into the piston 134, the partition wall 150 relatively moves toward the other stopper pin 162 in the shock absorbing chamber 156. The aforesaid movement is damped when the shock absorbing oil passes through the orifice 158 under a predetermined resistance because the kinetic energy is converted into heat energy. That is, the movement of the piston rod 148 is absorbed while making the cross-sectional area of the fluid passage in the orifice 158. Therefore, one of the stopper 152b of the piston 134 slowly and gradually approaches the corresponding position restricting surface 160a.

In a case where the piston rod 148 has been completely introduced into the piston 134, the stopper surface 152b of the piston 134 moderately comes in contact with the corresponding position restricting surface 160a while being absorbed. Thus, the shock absorbing operation of the shock absorbing mechanism 140 can be achieved.

As described above, heat is generated whenever the shock absorbing mechanism 140 performs the shock absorbing operation. Since this embodiment is characterized in that the shock absorbing mechanism 140 is included in the piston, the aforesaid heat is transmitted to the cylinder body 130 from an inner portion. If the heat is excessively accumulated in the cylinder body 130 or the piston 134, the gap present between the cylinder body 130 and the piston 134 becomes excessively large due to the difference in the coefficient of the thermal expansion. As a result, there arises a fear of loosing the sealing effect.

Figure 8:
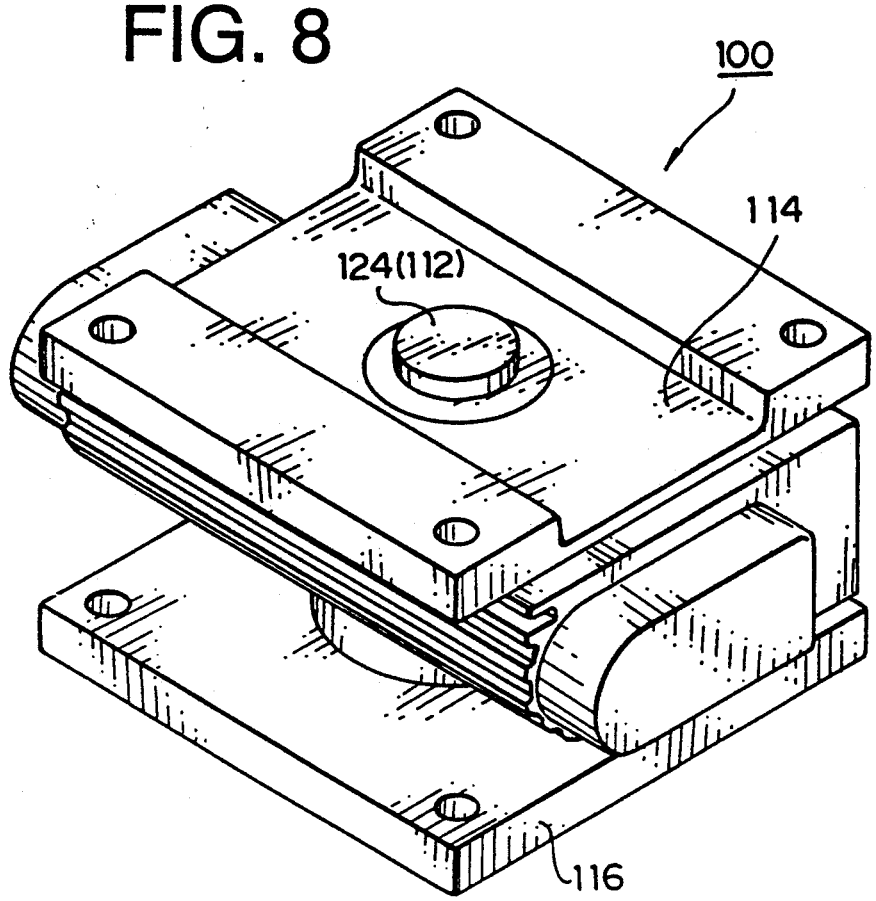
FIG. 8 is a perspective view which illustrates the structure of a rotation drive unit which uses the shock absorbing apparatus according to a second embodiment.
Figure 9:
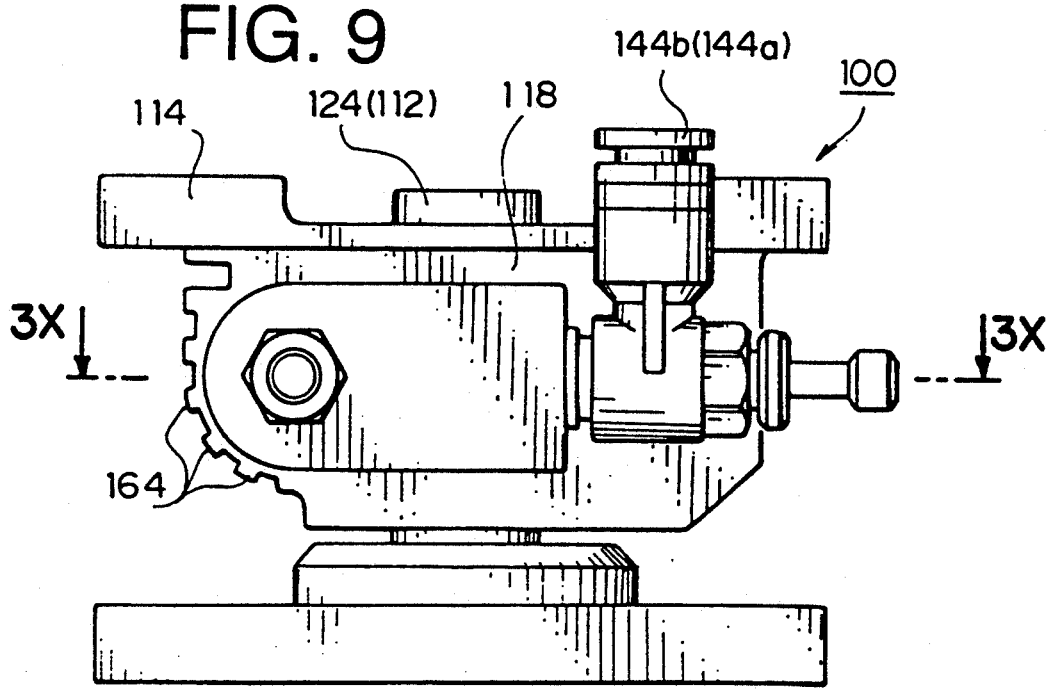
FIG. 9 is a front elevational view which illustrates the front shape of the rotation drive unit shown in FIG. 8.

As can be clearly seen from FIGS. 8 and 13, a plurality of heat radiating fins 166 are integrally formed with the outer surface of the cylinder body 130 according to this embodiment, the heat radiating fins 166 being formed in the axial direction. Since the heat radiating fins 166 are provided as described above, the heat generated at each execution of the shock absorbing operation can be effectively radiated from the heat radiating fins 166 toward the outside. Therefore, the excessive accumulation of the heat in the cylinder body 130 and the piston 134 can be prevented.

On the other hand, the rack 138 is moved upwards when viewed in FIG. 12 in a state where compressed air is being introduced into the sectioned cylinder chamber 132b disposed in the lower portion of FIG. 12. Therefore, the pinion gear 126 engaged to the rack 138 is rotated clockwise. As a result, another end portion of the piston rod 148 of the shock absorbing mechanism 140 included in the piston 134 first comes in contact with the corresponding position restricting surface 162a of the stopper pin 162. Therefore, the movement of the piston 134 is absorbed by the aforesaid shock absorbing mechanism 140, causing the stopper surface 154b of the other stopper block 154 of the piston 134 to moderately come in contact with the corresponding position restricting surface 162a of the stopper pin 162. As a result, the piston 134 is moderately stopped at the other stop position as shown in FIG. 11.

According to this embodiment, when the stopper block 154 of the piston 134 is positioned in contact with the corresponding stopper pin 162, the lower mounting base 116 aligns to the position of the upper mounting base 114.

In the rotation drive unit 100 according to this embodiment, when a change valve (omitted from illustration) is switched in a state shown in FIG. 11 and thereby compressed air is introduced into the upper sectioned cylinder chamber 132a when viewed in FIG. 11, the rack 138 is moved downwards. As a result, the pinion gear 126 engaged to the rack 138 is rotated counterclockwise until the stopper block 152 comes in contact with the corresponding stopper pin 160. In the state of this contact, the quantity of the rotation is restricted, that is the rotation is stopped.

This embodiment is arranged in such a manner that the lower mounting base 116 is rotated clockwise by an angular degree of 90° from the upper mounting base 114 when viewed from an upper portion in a state where the stopper block 152 is positioned in contact with the corresponding stopper pin 160.

Figure 10:
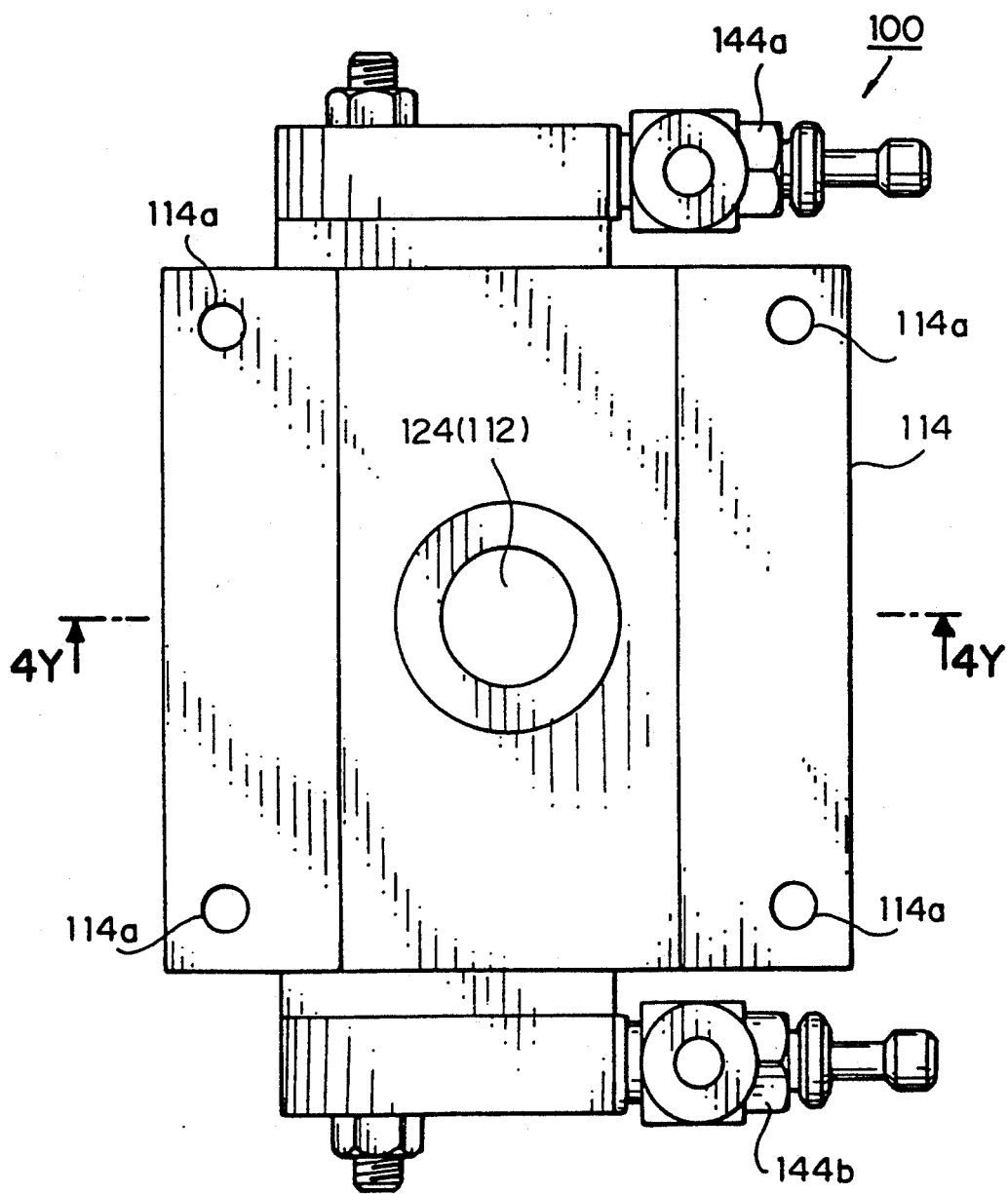
FIG. 10 is a plan view which illustrates the plan shape of the rotation drive unit shown in FIG. 8.

The upper mounting base 114 has, on the four corners thereof, fastening screw holes 114a having a diameter of $d_1$ and disposed at predetermined pitches D as shown in FIG. 10. Furthermore, the lower mounting base 116 has, on the four corners thereof, fastening through hole 116a in a state similar to the fastening holes 114a formed in the upper mounting base 114 as shown in FIG. 16.

As described above, the rotation drive unit 100 according to this embodiment has the shock absorbing mechanism 140 included in the piston 134. Therefore, the conventional structure in which the two shock absorbing mechanisms 140 are provided to correspond to the two stop positions of the piston 134 can be simplified to that in which one mechanism is required. Therefore, the overall weight can be reduced.

Furthermore, since the conventional shock absorbing mechanism is formed by combining the stopper pin, the shock absorbing mechanism is disposed while excessively projecting outwards over the cylinder body. However, according to this embodiment, only the stopper pins 160 and 162 outwards project over the cylinder body 130. Therefore, the overall structure of the rotation drive unit 100 having the shock absorbing mechanism 140 can be reduced.

Furthermore, this embodiment is provided with a performance changing member 164 for changing the cross-sectional area of the fluid passage of the orifice 158. As a result, for example, the shock absorbing performance, which is one of the factors of the rotating performance of the rotation drive unit 100 having the shock absorbing mechanism 140, can be changed. Therefore, the optimum shock absorbing performance for the rotating performance can be set arbitrarily. Thus, the selection of the rotation drive unit 100 can be selected from a wide range.

According to this embodiment, the groove of the orifice 158 is arranged in such a manner that the depth of its central portion is made to be deep and those at the two end portions are made to be shallow. As a result, the moving resistance during the movement operation of the piston 134 can be reduced. Therefore, a smooth movement can be performed and the shock absorbing performance can be reliably obtained when the piston 134 is stopped.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

For example, although the shock absorbing mechanism 140 is embodied in the rotation drive unit 100 according to the aforesaid embodiment, the present invention is not limited to this. The present invention may be applied to any structure in which the shocks which can be generated at the two end positions at the time of stopping a drive unit which performs a reciprocating motion. For example, the present invention may be applied to a reversing apparatus serving as a reversing module $M_1$ which forms a hand mechanism, which is the aforesaid structure.

Then, description of a reversing apparatus 70 to which the shock absorbing apparatus according to the present invention is applied will be made. The same reference numerals as those according to the aforesaid embodiment are given the same reference numerals and their descriptions are omitted here.

Figure 14:
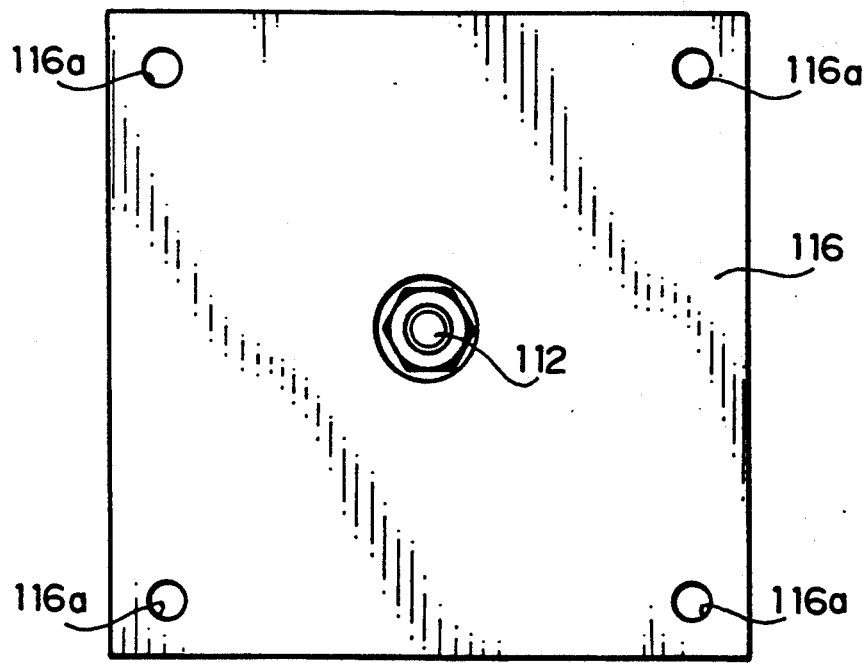
FIG. 14 is a bottom view which illustrates the lower mounting base of the rotation drive unit.

As shown in FIGS. 17A to 17G, the reversing apparatus 70 serving as the reversing module $M_1$ for performing the reversing operation has a pair of mounting bases 74 and 76 disposed vertically in such a manner that they are relatively rotatable around a rotational shaft 72 disposed perpendicular to the central axis of the reversing apparatus 70. The upper mounting base 74 integrally comprises a mounting stay 78 downwards projecting over the lower surface of the upper mounting base 74. The lower mounting base 76 integrally comprises a pair of mounting stays 80a and 80b upwards projecting over the top surface of the lower mounting base 76. The aforesaid rotational shaft 72 sequentially penetrates the aforesaid mounting stays 80a, 78 and 80b as shown in FIG. 14.

The rotational shaft 72 is rotatively journalled by the mounting stay 78 with a pair of bearing members 82a and 82b while penetrating a penetrating hole 84 formed to extend in the same direction as the direction of the pair of the bearing members 82a and 82b. The rotational shaft 72 is secured to the two mounting stays 80a and 80b at the two end portions thereof in such a way that it is able to be integrally rotated. The rotational shaft 72 has, at the central portion thereof, that is its portion inserted into the penetrating hole 84 formed in the mounting stay 78, a pinion gear 86 in such a manner that the pinion gear 86 is able to be integrally rotated.

Figure 17E:
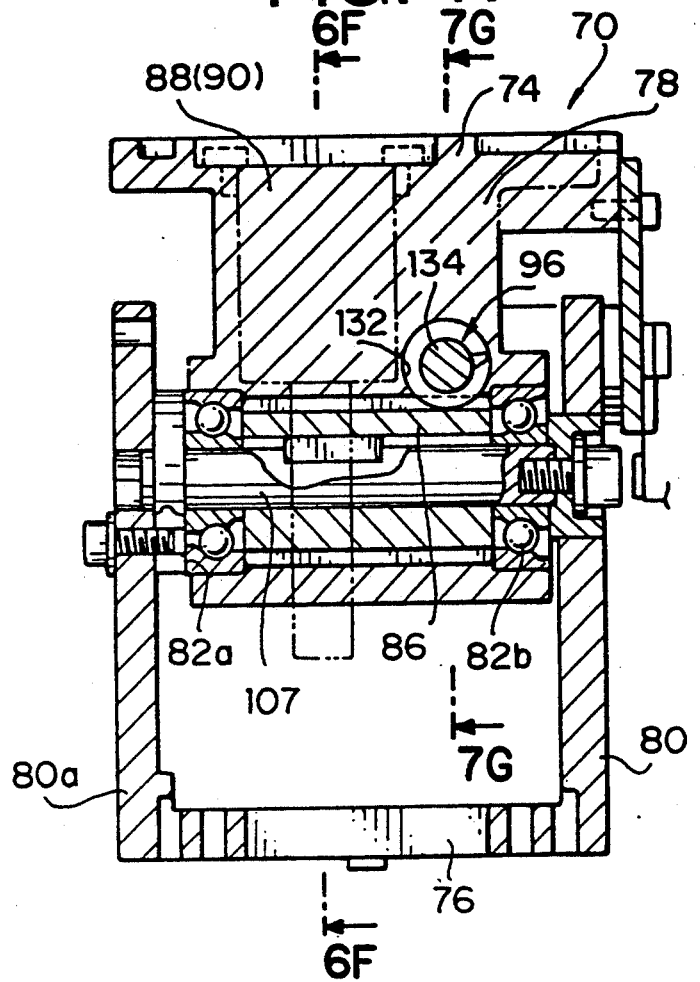
FIG. 17E is a vertical cross sectional view which illustrates the reverse drive unit and which is taken along line 5E—5E of FIG. 17C.
Figure 18:
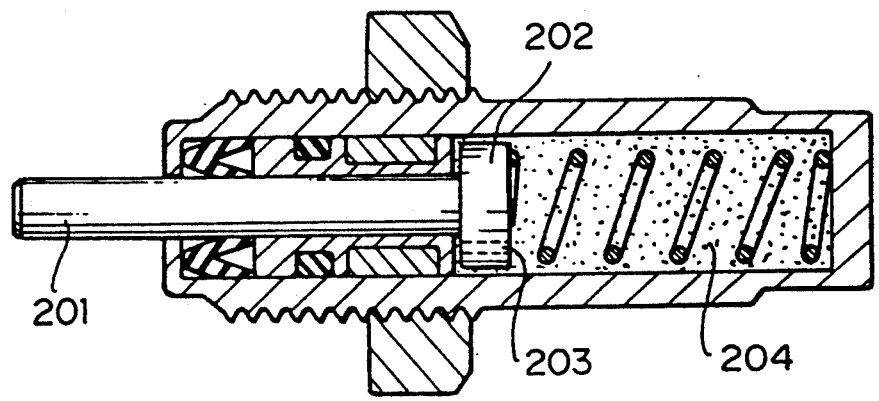
FIG. 18 is a cross sectional view which illustrates a conventional single-type shock absorbing apparatus.
Figure 17F:
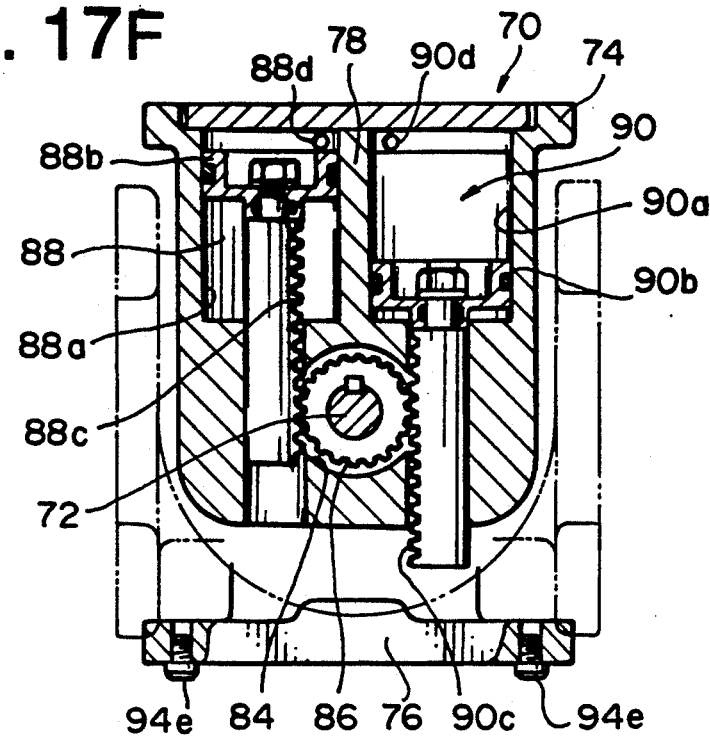
FIGS. 17F and 17G respectively are a vertical cross sectional view which illustrates the reverse drive unit and which is taken along line 6F—6F of FIG. 17E and a vertical cross sectional view which illustrates the same and which is taken along line 7G—7G of FIG. 17E.

As shown in FIG. 17F, the aforesaid mounting stay 78 includes a pair of air cylinder mechanisms 88 and 90 for rotating the rotational shaft 78, the pair of air cylinder mechanisms 88 and 90 being disposed to vertically project while interposing the rotational shaft 72.

The air cylinder mechanisms 88 and 90, are respectively composed of cylinder chambers 88a and 90a formed in the mounting stay 78, pistons 88b and 90b hermetically and slidably inserted into the corresponding cylinder chambers 88a and 90a and rack members 88c and 90c formed adjacent to the corresponding pistons 88b and 90b and downwardly projecting over the cylinder chambers 88a and 90a.

The two rack members 88c and 90c are engaged to the aforesaid pinion gear 86. The cylinder chambers 88a and 88b are arranged in such a manner that they are supplied compressed air for operating via compressed air introducing passages 88d and 90d formed at the top end portions of the cylinder chambers 88a and 88b. The two compressed air introducing passages 88d and 90d are arranged in such a manner that compressed air for operating is selectively introduced to them via a change valve (omitted from illustration).

Figure 17G:
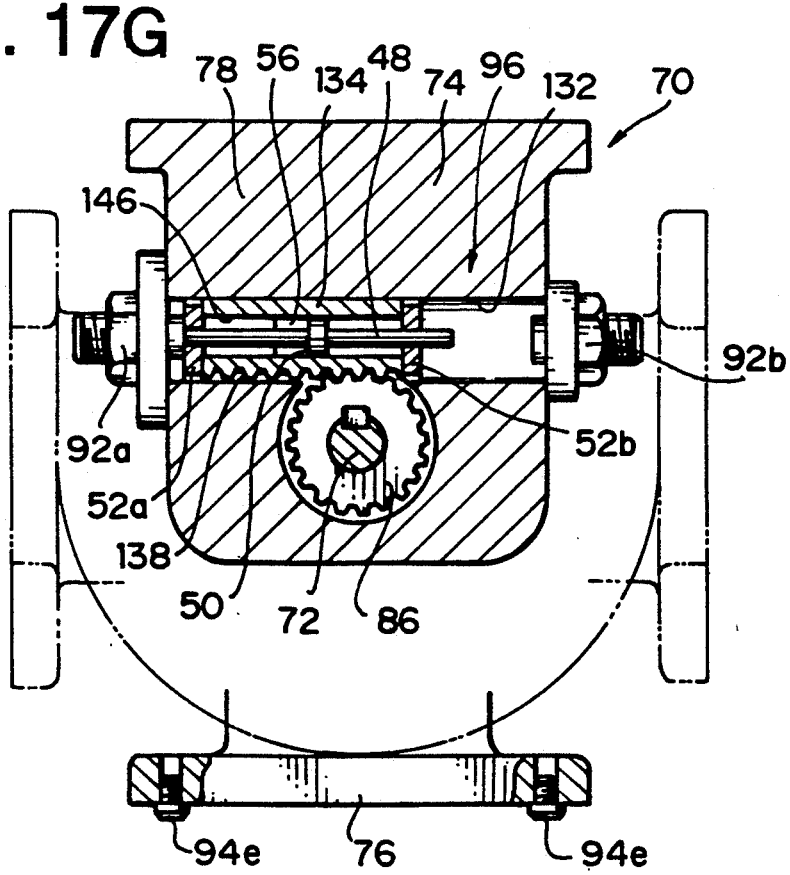

Since the reversing apparatus 70 is constituted as described above, in a state where compressed air is, as shown in FIG. 17F, being introduced into the air cylinder mechanism 90 disposed in the right portion of FIG. 17F, the corresponding rack member 90c is pushed downwards. Therefore, the pinion gear 86 engaged to the rack member 90c is rotated clockwise and, as shown in FIG. 17G, comes in contact with the stopper pin 92a by the action of the shock absorbing mechanism 96 structure similarly to that according to the aforesaid embodiment in a state where the shock is absorbed and is stopped, the rack member 90c being then stopped as described later. The reversing apparatus 70 has the lower lower mounting base 76 positioned in parallel to the upper mounting base 74 in a state where the piston 34 of the shock absorbing mechanism 96 is positioned in contact with the left stopper pin 92a as described above.

In the reversing apparatus 70, the change valve (omitted from illustration) is switched in a state shown in FIG. 17F, causing compressed air to be introduced into the air cylinder mechanism 88 disposed in the left portion of the drawing. As a result, the corresponding rack member 88c is pushed downwards, causing the pinion gear 86 engaged to the rack member 88c to be rotated counterclockwise as designated by an alternate long and two dashes line until the piston 134 of the shock absorbing mechanism 96 comes in contact with the right stopper pin 92b and the piston 134 is stopped due to the contact. The lower mounting base 76 intersects the upper mounting base 74 while making an angle of 90° in a state where the piston 134 is positioned in contact with the right stopper pin 92b.

The upper mounting base 74 has, on the four corners thereof, fastening screw holes 94a having a diameter d1 at the aforesaid predetermined pitch D from one another. The lower mounting base 76 has on the four corners thereof, through holes 94b for fastening similarly to the fastening screw holes 94a. The upper mounting base 74 has the top surface in which locating hole 94c and a locating groove 94d to which a pair of locating pins are respectively inserted are formed at the central portions of the opposing two sides. At the central portions of the opposing two sides of the lower surface of the lower mounting base 76, a pair of locating pins 94e each having a diameter $d_2$ and positioned away from each other by a predetermined distance $D_2$ so as to be respectively inserted into the locating hole and the locating groove, the pair of the locating pins 94e projecting downwards and being formed integrally with the lower mounting base 76.

The shock absorbing mechanism 96 provided for the reversing apparatus 70 is, as shown in FIGS. 17E and 17G, partially communicated with the penetrating hole 84 while projecting in a direction perpendicular to a direction in which the penetrating hole 84 is formed. The upper mounting stay 78 includes a cylinder chamber 132 which slidably accommodates a piston 134.

Similarly to the aforesaid embodiment, the piston 134 has a rack formed on one side thereof, the rack 138 being engaged to the pinion gar 86 integrally fastened to the rotational shaft 72. The other structures of the shock absorbing mechanism 96 are similar to those of the shock absorbing mechanism 96 provided for the aforesaid rotation drive unit 10.

Since the reversing apparatus 70 has the shock absorbing mechanism 96, the rotational shaft 72 is rotated when the pistons 88b and 90b of the pair of air cylinder mechanisms 88 and 90 slide and move in the cylinder chambers 88a and 90a. As a result, the lower mounting base 76 is reversed relatively to the upper mounting base 74. The quantity of rotation of the lower mounting bade 76, that is the quantity of revolution of the rotational shaft 72 is determined similarly to the aforesaid embodiment. That is, one of the stop positions of the piston 134 is determined by the contact of the stopper surface 52a of the stopper block 52 of the piston 34 of the shock absorbing mechanism 96 and the position restricting surface 60a of the stopper pin 60. Furthermore, the other stop position of the piston 134 is determined by the contact of the stopper surface 54a of the stopper block 54 of the piston 134 and the position restricting surface 62a of the other stopper pin 62.

The shock absorbing operation is performed by the shock absorbing mechanism 96 in the operation of stopping the piston 134 similarly to the aforesaid embodiment.

Since the reversing apparatus 70 has the shock absorbing mechanism 96 as described above, a similar effect to that obtainable from a case where the same is provided for the rotation drive unit 100 can be obtained.

The rotation drive unit 100 and the reversing apparatus 70 may be respectively applied as a rotation module $M_3$ and the reversing module $M_1$ for the hand mechanism disclosed by the same application as that of the present invention as "METHOD OF SELECTING HAND MECHANISM OF ROBOT" (Japanese Laid-Open Patent Application No. 4-13583 published on Jan. 17, 1992), resulting in the following specific effect to be obtained in the process of selecting the hand mechanism.

That is, if setting is made in such a manner that the leading portion of the piston rod comes in contact with the stopper pin in an open state, fine conduct dust is generated because of the contact of the leading portion of the piston rod with the stopper pin at each locating operation. The dust is scattered environment. That is, if the contact portion is opened outside, the fine dust is undesirably scattered outside. If parts which must be clean enough are assembled in a clean room, the hand mechanism of the type described above having a rotation module which comprises the aforesaid open type contact portion is not selected.

However, the rotation drive unit 100 and the reversing apparatus 70 respectively have the shock absorbing mechanisms 140 and 96 and the contact portions in the shock absorbing mechanisms 140 and 96 are located in the cylinder chamber 132. Therefore, even if fine dust is generated due to the contact at the time of the locating operation, the fine dust remains in the cylinder chamber 132. Therefore, the contamination of the environment can be prevented. Therefore, if the hand mechanism must have cleanliness, the rotating module $M_3$ based on the rotation drive unit or the reversing module $M_1$ based on the reversing apparatus is selected.

Furthermore, the shock absorbing operation is automatically performed by the shock absorbing mechanism 96 or 140 whenever the rotation or the reversing motion is stopped. Therefore, the rotating speed or the reversing speed can be set to a high speed. As a result, the tact time of the subject operation can be shortened. That is, if the shock absorbing operation is not performed when the subject apparatus is stopped, the shock generated at this time directly acts on another module, the arm mechanism of a robot or a work held by the hand mechanism. Therefore, the rotating speed or the reversing speed must be lowered in order to reduce the shock. However, since the shock absorbing mechanism 96 or 140 automatically performs the shock absorbing operation whenever the rotation or the reversing action of the rotation drive unit 100 or the reversing apparatus 70 is stopped, the rotating speed or the reversing speed can be set to a high speed.

As described above, according to the present invention, the shock absorbing apparatus capable of reliably absorbing shock generated at the time of stopping the drive piston can be provided while reducing the overall size and the weight of the apparatus which includes the shock absorbing apparatus.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A rotational drive apparatus having a shock absorbing unit comprising:

a first base member;
   a shaft body having a pinion around an outer surface thereof and being mounted on said first base member;
   a second base member being rotatably supported around said shaft body;
   a cylinder chamber member having a first cylinder portion and a second cylinder portion and being attached to said second base member;
   a piston member reciprocally supported in said cylinder chamber, said piston chamber having a rack which engages said pinion;
   a first cap member and a second cap member sealingly supported on said first cylinder portion and said second cylinder portion, respectively;
   a first piston supported by said first cap member for reciprocal member in a first portion of said piston member and projecting outwardly therefrom;
   a second piston supported in said second cap member for reciprocal movement in a second portion of said piston member and projecting outwardly therefrom;
   an orifice member provided between said first cylinder portion and said second cylinder portion, with an operational fluid filling a hole in said orifice member and space in the first and second portions of said piston member; and
   drive means provided in said second base member for supplying a driving fluid into said first cylinder portion through a first port and into said second cylinder portion through a second port.

2. A rotational drive apparatus having a shock absorbing unit according to claim 1, wherein said orifice member is adjustable to change an opening size of the hole and regulate an absorbing force of said reciprocating piston member.

3. A rotational drive apparatus having a shock absorbing unit according to claim 1, further comprising a heat radiating portion formed on an outer surface of said cylinder chamber member.

4. A rotational drive apparatus having a shock absorbing unit according to claim 1, further comprising a first adjustable stopper member in said first cylinder portion and a second adjustable stopper member in said second cylinder portion.

5. A rotational drive apparatus having a shock absorbing unit comprising:

a first base member;
   a shaft body having a pinion around an outer surface thereof and being mounted on said first base member;
   a second base member being rotatably supported around said shaft body;
   a cylinder chamber member formed in said second base member;
   a piston member reciprocally supported in said cylinder chamber member, said piston member having a rack which engages said pinion;
   a first cap member and a second cap member sealingly supporting opposite ends of said piston member;
   a piston rod supported by said first and second cap members in said piston member for reciprocal movement in said cylinder chamber member;
   an orifice member provided on said piston rod and capable of regulating operational fluid filled in a cylinder position within said piston member; and drive means for supplying drive fluid into said cylinder chamber through a first port to a first end of said cylinder chamber and a second port to a second end of said cylinder chamber member.

6. A rotational drive apparatus having a shock absorbing unit according to claim 5, wherein said orifice member is adjustable to regulate an absorbing force of said reciprocating piston member.

7. A rotational drive apparatus having a shock absorbing unit according to claim 5, further comprising a heat radiating portion formed on an outer surface of said cylinder chamber member.

8. A rotational drive apparatus having a shock absorbing unit according to claim 5, wherein said cylinder chamber member has a first adjustable stopper member and a second adjustable stopper member disposed in said cylinder chamber member.

* * * * *

UNITED STATES PATENT AND TRADEMARK OFFICE
CERTIFICATE OF CORRECTION

PATENT NO. : 5,323,884
DATED : June 28, 1994
INVENTOR(S) : Machino

It is certified that error appears in the above-indentified patent and that said Letters Patent is hereby corrected as shown below:

TITLE PAGE:

[56] REFERENCES CITED:

U.S. PATENT DOCUMENTS, "3,156,160  11/1964  Meyer" should read --3,156,160  11/1964  Meyer et al.--.

COLUMN 5:

Line 27, "serve stoppers" should read --serve as stoppers--.

COLUMN 6:

Line 48, "a" should be deleted.

COLUMN 8:

Line 34, "of" should be deleted.

COLUMN 10:

Line 8, "couter-" should read --counter- --.
Line 63, "frame" should read --blocks--.

COLUMN 12:

Line 59, "one of the stopper 152b" should read --the stopper surface 152b--.

COLUMN 14:

Line 52, "which" should be deleted.

UNITED STATES PATENT AND TRADEMARK OFFICE
CERTIFICATE OF CORRECTION

PATENT NO. : 5,323,884
DATED : June 28, 1994
INVENTOR(S) : Machino

It is certified that error appears in the above-indentified patent and that said Letters Patent is hereby corrected as shown below:

<u>COLUMN 16</u>:

Line 37, "gar 86" should read --gear 86--.
  Line 49, "bade 76," should read --base 76,--.
  Line 54, "piston 34" should read --piston 134--.

<u>COLUMN 18</u>:

Line 11, "chamber" should read --member--.
  Line 18, "member" should read --movement--.
  Line 53, "being" should be deleted.

Signed and Sealed this

Twenty-seventh Day of December, 1994

Attest:

BRUCE LEHMAN

Attesting Officer      Commissioner of Patents and Trademarks